United States Patent
Li et al.

(10) Patent No.: US 11,479,513 B2
(45) Date of Patent: Oct. 25, 2022

(54) ANTISKID AND WEAR-RESISTANT GLAZE, ANTISKID, WEAR-RESISTANT AND EASY-TO-CLEAN CERAMIC TILE AND PREPARATION METHOD THEREOF

(71) Applicant: Guangdong Kito Ceramics Group CO., LTD., Foshan (CN)

(72) Inventors: Deying Li, Foshan (CN); Yonggang Dai, Foshan (CN); Lifeng Zhong, Foshan (CN); Jingjun Yu, Foshan (CN)

(73) Assignee: Guangdon Kito Ceramics Group Co., Ltd., Foshan (CN)

( * ) Notice: Subject to any disclaimer, the term of this patent is extended or adjusted under 35 U.S.C. 154(b) by 1132 days.

(21) Appl. No.: 16/071,888

(22) PCT Filed: Dec. 13, 2017

(86) PCT No.: PCT/CN2017/116013
§ 371 (c)(1),
(2) Date: Jul. 20, 2018

(87) PCT Pub. No.: WO2019/015237
PCT Pub. Date: Jan. 24, 2019

(65) Prior Publication Data
US 2021/0147307 A1    May 20, 2021

(30) Foreign Application Priority Data

Jul. 21, 2017  (CN) .......................... 201710600631.0
Jul. 21, 2017  (CN) .......................... 201710601182.1
Jul. 21, 2017  (CN) .......................... 201710606089.X

(51) Int. Cl.
B32B 15/04   (2006.01)
B32B 17/06   (2006.01)
(Continued)

(52) U.S. Cl.
CPC ................ *C04B 41/86* (2013.01); *C03C 8/12* (2013.01); *C03C 8/20* (2013.01); *C04B 33/30* (2013.01);
(Continued)

(58) Field of Classification Search
CPC .................................................. C03C 2204/00
(Continued)

(56) References Cited

U.S. PATENT DOCUMENTS

2012/0009400 A1*  1/2012  Nauer ..................... B32B 9/047
                                                      428/428
2014/0087179 A1   3/2014  Takano et al.

FOREIGN PATENT DOCUMENTS

CN  202658086 U  1/2013
CN  104261897 A  1/2015
(Continued)

OTHER PUBLICATIONS

Indian Examination Report for Application No. 201847042795 dated Feb. 25, 2020, 5 pages.
(Continued)

*Primary Examiner* — Lauren R Colgan
(74) *Attorney, Agent, or Firm* — Suiter Swantz pc llo

(57) ABSTRACT

An antiskid and wear-resistant glaze, an antiskid, wear-resistant and easy-to-clean ceramic tile and a preparation method thereof, relating to the technical field of building ceramics, are provided. This antiskid and wear-resistant glaze is prepared by antiskid and wear-resistant particles, a printing paste and sodium tripolyphosphate. This antiskid, wear-resistant and easy-to-clean ceramic tile comprises, from the bottom up, a green body layer, an overglaze layer, a decoration layer, an antiskid and wear-resistant layer and an easy-to-clean protection layer provided in turn, wherein the antiskid and wear-resistant layer is mainly prepared by
(Continued)

| (5) | EASY-TO-CLEAN PROTECTION LAYER |
| --- | --- |
| (4) | ANTISKID AND WEAR-RESISTANT LAYER |
| (3) | DECORATION LAYER |
| (2) | OVERGLAZE LAYER |
| (1) | GREEN BODY LAYER | antiskid and wear-resistant particles, and the easy-to-clean protection layer is mainly prepared by easy-to-clean protection particles.

17 Claims, 2 Drawing Sheets

(51) Int. Cl.
  *C04B 41/86* (2006.01)
  *C03C 8/20* (2006.01)
  *C04B 33/30* (2006.01)
  *C04B 41/89* (2006.01)
  *C03C 8/12* (2006.01)
(52) U.S. Cl.
  CPC .......... *C04B 41/89* (2013.01); *C03C 2204/00* (2013.01); *C03C 2217/212* (2013.01); *C03C 2217/213* (2013.01); *C03C 2217/214* (2013.01); *C03C 2217/217* (2013.01); *C03C 2217/228* (2013.01); *Y10T 428/31504* (2015.04)
(58) Field of Classification Search
  USPC .................................................. 428/701, 702
  See application file for complete search history.

(56) References Cited

FOREIGN PATENT DOCUMENTS

| | | | |
|---|---|---|---|
| CN | 104261897 | B | 12/2015 |
| CN | 105600173 | A | 5/2016 |
| CN | 106396741 | A | 2/2017 |
| CN | 107265861 | A | 10/2017 |
| CN | 107265865 | A | 10/2017 |
| CN | 107285737 | A | 10/2017 |
| CN | 107285812 | A | 10/2017 |
| CN | 107311457 | A | 11/2017 |
| CN | 107365080 | A | 11/2017 |
| CN | 107382377 | A | 11/2017 |
| CN | 107399911 | A | 11/2017 |
| JP | 2014069098 | A | 4/2014 |

OTHER PUBLICATIONS

International Search Report dated Apr. 18, 2018 for PCT/CN2017/116013.
Written Opinion of the International Search Report dated Apr. 18, 2018 for PCT/CN2017/116013.

* cited by examiner

| (5) EASY-TO-CLEAN PROTECTION LAYER |
|---|
| (4) ANTISKID AND WEAR-RESISTANT LAYER |
| (3) DECORATION LAYER |
| (2) OVERGLAZE LAYER |
| (1) GREEN BODY LAYER |

FIG. 1

(a) PREPARING A GREEN BODY LAYER USING A BLANK (b) APPLYING AN OVERGLAZE ON THE GREEN BODY LAYER TO FORM AN OVERGLAZE LAYER (c) PERFORMING INK-JET PRINTING ON THE OVERGLAZE LAYER TO PREPARE A DECORATION LAYER (d) PRINTING AN ANTI-SKID AND WEAR-RESISTANT GLAZE ON THE DECORATION LAYER TO FORM AN ANTISKID AND WEAR-RESISTANT LAYER (e) APPLYING AN EASY-TO-CLEAN PROTECTION GLAZE ON THE ANTISKID AND WEAR-RESISTANT LAYER TO FORM AN EASY-TO-CLEAN PROTECTION LAYER (f) PLACING THE GREEN BODY LAYER, THE OVERGLAZE LAYER, THE DECORATION LAYER, THE ANTISKID AND WEAR-RESISTANT LAYER AND THE EASY-TO-CLEAN PROTECTION LAYER STACKED IN SEQUENCE IN A KILN TO BE FIRED, TO PREPARE AN ANTISKID, WEAR-RESISTANT AND EASY-TO-CLEAN CERAMIC TILE (g) CARRYING OUT POLISHING AND EDGING TREATMENTS ON THE ANTISKID, WEAR-RESISTANT AND EASY-TO-CLEAN CERAMIC TILE GREEN BODY TO OBTAIN THE ANTISKID, WEAR-RESISTANT AND EASY-TO-CLEAN CERAMIC TILE

FIG. 2

ANTISKID AND WEAR-RESISTANT GLAZE, ANTISKID, WEAR-RESISTANT AND EASY-TO-CLEAN CERAMIC TILE AND PREPARATION METHOD THEREOF

CROSS-REFERENCE TO RELATED APPLICATIONS

The present application is a national stage filing under 35 U.S.C. 371 of International Application No. PCT/CN2017/116013, filed on Dec. 13, 2017 and entitled "Antiskid and Wear-resistant Glaze, Antiskid, Wear-resistant and Easy-to-clean Ceramic Tile and Preparation Method thereof," which claims priority to the Chinese patent application No. 2017106011821, filed with the State Intellectual Property Office on Jul. 21 2017 and entitled "Preparation method of an antiskid, wear-resistant and easy-to-clean ceramic tile", the Chinese patent application No. 2017106006310, filed with the State Intellectual Property Office on Jul. 21, 2017 and entitled "Antiskid, Wear-resistant and Easy-to-clean Ceramic Tile", and the Chinese patent application No. 201710606089X, filed with the State Intellectual Property Office on Jul. 21, 2017 and entitled "Antiskid and Wear-resistant Glaze and Preparation Method thereof", which are incorporated herein by reference in their entirety.

TECHNICAL FIELD

The present disclosure relates to the technical field of building ceramics, and particularly to an antiskid and wear-resistant glaze, an antiskid, wear-resistant and easy-to-dean ceramic tile and a preparation method thereof.

BACKGROUND ART

Ceramic archaized tiles, a type of building decoration material popular in recent years, are gorgeous as polished tiles and colorful in patterns as porcelains, have many advantages such as modern or vintage appeal and individuality, and are highly popular in the market and well received by consumers.

With increasing improvements on people's life, consumers also have more and more requirements on the aspect of functions of the ceramic archaized tiles. However, the ceramic archaized tiles currently available in the market are generally insufficient in surface wear-resistant strength, and easily scratched and worn, thus affecting aesthetics and grade of products. Moreover, the products have low antiskid coefficients, especially when there is water on surfaces of the products, people may easily fall, meanwhile, there are still defects such as difficult cleaning, dirt hiding, and darkening of the products after a long term.

In view of these, the present disclosure is specifically proposed.

SUMMARY

A first object of the present disclosure is to provide an antiskid and wear-resistant glaze, which antiskid and wear-resistant glaze has good antiskid and wear-resistant effects through reasonable cooperation (coordination) of various raw materials and various components of antiskid and wear-resistant particles.

A second object of the present disclosure is to provide an antiskid, wear-resistant and easy-to-clean ceramic tile, so as to address the technical problems in the current market that the ceramic archaized tiles generally have the defects such as insufficient surface wear-resistant strength, being easily scratched and easily worn, rendering low antiskid coefficients to the products, and meanwhile difficult cleaning, dirt hiding, and darkening of the products after a long term.

A third object of the present disclosure is to provide a preparation method of an antiskid, wear-resistant and easy-to-clean ceramic tile, wherein the prepared antiskid, wear-resistant and easy-to-clean ceramic tile not only has high wear-resistant strength, and is not easily worn, but also renders high antiskid coefficients to the products, which can effectively prevent people from falling down and improve the safety of the products, and meanwhile, it also has excellent pollution resistance, is not prone to hide dirt, and is easily cleaned.

Embodiments of the present disclosure are implemented as follows:

An antiskid and wear-resistant glaze provided in the present disclosure is prepared from the following raw materials in parts by mass: 90-110 parts of antiskid and wear-resistant particles, 90-110 parts of printing paste and 0.2-0.4 part of sodium tripolyphosphate, wherein the antiskid and wear-resistant particles mainly consist of the following components in parts by mass: 60-70 parts of $SiO_2$, 20-30 parts of $Al_2O_3$, 0.01-1 part of $Fe_2O_3$, 0.1-2 part of $TiO_2$, 1-5 parts of $Na_2$, 1-10 parts of $K_2O$, 0.01-1 part of MgO, 0.1-5 parts of CaO, and 0.1-2 parts of ignition loss.

Further, the printing paste consists of the following components in parts by mass: 2-3 parts of sodium carboxymethylcellulose, 40-60 parts of ethylene glycol and 40-60 parts of water.

An antiskid, wear-resistant and easy-to-clean ceramic tile provided in the present disclosure includes, from the bottom up, a green body layer, an overglaze layer, a decoration layer, an antiskid and wear-resistant layer and an easy-to-dean protection layer provided in sequence, wherein the antiskid and wear-resistant layer is prepared from an antiskid and wear-resistant glaze, the antiskid and wear-resistant glaze is mainly prepared by antiskid and wear-resistant particles, and the antiskid and wear-resistant particles mainly consist of the following components in parts by mass: 60~70 parts of $SiO_2$, 20~30 parts of $Al_2O_3$, 0.01~1 parts of $Fe_2O_3$, 0.1~2 parts of $TiO_2$, 1~5 parts of $Na_2$, 1~10 parts of $K_2O$, 0.01~1 parts of MgO, 0.1~5 parts of CaO and 0.1~2 parts of ignition loss, with the sum of all the components being 100 parts; the easy-to-clean protection layer is prepared by an easy-to-clean protection glaze, the easy-to-clean protection glaze is mainly prepared by easy-to-clean protection particles, and the easy-to-clean protection particles mainly consist of the following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2$, 2~6 parts of $K_2O$, 0.05~0.3 part of MgO, 0.5~3 parts of CaO and 0.05~0.3 part of ignition loss, with the sum of all the components being 100 parts.

Further, the antiskid and wear-resistant particles mainly consist of the following components in parts by mass: 62~68 parts of $SiO_2$, 20~25 parts of $Al_2O_3$, 0.05~1 parts of $Fe_2O_3$, 0.5~1.5 parts of $TiO_2$, 2~3 parts of $Na_2O$, 2~6 parts of $K_2O$, 0.02~0.08 part of MgO, 2~4 parts of CaO and 0.1~1.5 parts of ignition loss, with the sum of all the components being 100 parts; the easy-to-clean protection particles mainly consist of the following components in parts by mass: 62~68 parts of $SiO_2$, 18~23 parts of $Al_2O_3$, 0.1~0.2 part of $Fe_2O_3$, 0.02~0.08 part of $TiO_2$, 5~7 parts of $Na_2O$, 3~6 parts of $K_2O$, 0.1~0.2 part of MgO, 1~3 parts of CaO and 0.1~0.3 part of ignition loss, with the sum of all the components being 100 parts.

Further, the antiskid and wear-resistant particles mainly consist of the following components in parts by mass: 65~66 parts of $SiO_2$, 22~23 parts of $Al_2O_3$, 0.07~0.09 part of $Fe_2O_3$, 0.9~1.1 parts of $TiO_2$, 2~2.5 parts of $Na_2O$, 4~5 parts of $K_2O$, 0.03~0.05 part of $MgO$, 2~3 parts of $CaO$ and 0.7~0.8 part of ignition loss, with the sum of all the components being 100 parts; the easy-to-clean protection particles mainly consist of the following components in parts by mass: 66~67 parts of $SiO_2$, 20~22 parts of $Al_2O_3$, 0.15~0.2 part of $Fe_2O_3$, 0.05~0.07 part of $TiO_2$, 5~7 parts of $Na_2O$, 4~5 parts of $K_2O$, 0.1~0.15 part of $MgO$, 1.5~2 parts of $CaO$ and 0.1~0.2 part of ignition loss, with the sum of all the components being 100 parts.

Further, the main raw materials of the easy-to-clean protection glaze further comprise, in parts by mass, 230~270 parts of printing ink and 20~40 parts of transparent glaze, wherein the printing ink mainly consists of the following components in parts by mass: 1~2 parts of sodium carboxymethylcellulose, 20~40 parts of ethylene glycol, 1~5 parts of bentonite and 60~80 parts of water.

Further, the transparent glaze mainly consists of the following components in parts by mass: 12~16 parts of soda feldspar, 20~24 parts of potassium feldspar, 13~17 parts of calcined talc, 7~11 parts of limestone, 8~12 parts of barium carbonate and 1~5 parts of zinc oxide.

Further, granular compositions of the antiskid and wear-resistant particles comprise: particles of 80~120 meshes 20%~30%, particles of 120~180 meshes 50%~60%, and the particles of less than 200 meshes as balance. Preferably, the antiskid and wear-resistant particles have a specific gravity of 1.2~1.8 $g/cm^3$, and a flow velocity of 80~100 seconds.

Further, granular compositions of the antiskid and wear-resistant particles comprise: particles of 80~120 meshes 50%~60%, particles of 120~200 meshes 20%~30%, and particles of less than 200 meshes as balance.

Preferably, the easy-to-clean protection particles have a specific gravity of 1.2~1.4 $g/cm^3$.

Further, the overglaze layer is prepared by an overglaze, and the overglaze is mainly prepared by the following raw materials in parts by mass: 20~30 parts of potassium feldspar, 15~30 parts of quartz, 15~25 parts of nepheline, 5~10 parts of calcined kaolin, 5~15 parts of aluminum oxide, 1~8 parts of wollastonite, 0.1~2 parts of zinc oxide, 10~30 parts of zirconium silicate, 10~20 parts of columnar kaolin, 0.1~0.3 part of sodium humate, 0.1~0.3 part of sodium carboxymethylcellulose and 0.1~0.3 part of sodium tripolyphosphate.

Further, the green body layer is prepared by a blank, the blank is mainly prepared by the following raw materials in parts by mass: 18~22 parts of quartz sand, 12~18 parts of potassium and sodium sand, 16~20 parts of water washed mud, 9~13 parts of white mud, 28~33 parts of potassium sand, 0.5~1.5 parts of bentonite and 2~3 parts of black talc.

Besides, a preparation method of an antiskid, wear-resistant and easy-to-dean ceramic tile provided in the present disclosure includes the following steps:

(a) preparing a green body layer from a blank;

(b) applying an overglaze on the green body layer to form an overglaze layer;

(c) performing ink-jet printing on the overglaze layer to prepare a decoration layer;

(d) printing an antiskid and wear-resistant glaze on the decoration layer to form an antiskid and wear-resistant layer, wherein the antiskid and wear-resistant glaze is mainly prepared by antiskid and wear-resistant particles, and the antiskid and wear-resistant particles mainly consist of the following components in parts by mass: 60~70 parts of $SiO_2$, 20~30 parts of $Al_2O_3$, 0.01~0.1 part of $Fe_2O_3$, 0.1~2 parts of $TiO_2$, 1~5 parts of $Na_2O$, 1~10 parts of $K_2O$, 0.1~1 part of $MgO$, 0.1~5 parts of $CaO$ and 0.1~2 parts of ignition loss;

(e) applying the easy-to-clean protection glaze on the antiskid and wear-resistant layer to form an easy-to-clean protection layer, wherein the easy-to-dean protection glaze is mainly prepared by easy-to-dean protection particles, and the easy-to-dean protection particles mainly consist of the following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2O$, 2~6 parts of $K_2O$, 0.05~0.3 part of $MgO$, 0.5~3 parts of $CaO$ and 0.05~0.3 part of ignition loss;

(f) placing the green body layer, the overglaze layer, the decoration layer, the antiskid and wear-resistant layer and the easy-to-clean protection layer stacked in sequence in a kiln to be fired, to prepare an antiskid, wear-resistant and easy-to-clean ceramic tile green body; and (g) carrying out polishing and edging treatments on the antiskid, wear-resistant and easy-to-clean ceramic tile green body to obtain the antiskid, wear-resistant and easy-to-clean ceramic tile.

Further, the above preparation method of an antiskid, wear-resistant and easy-to-clean ceramic tile further includes Step (s) primary drying, wherein the Step (s) is provided between Step (a) and Step (b), and the Step (s) comprises placing the green body layer in a drying kiln to be dried, with a drying temperature of 100~160° C., and a drying cycle of 50~70 min.

Further, the above preparation method of an antiskid, wear-resistant and easy-to-clean ceramic tile further includes Step (p) secondary drying, wherein the Step (p) is provided between Step (e) and Step (f), and the Step (p) comprises placing the green body layer, the overglaze layer, the decoration layer, the antiskid and wear-resistant layer and the easy-to-clean protection layer stacked in sequence in the drying kiln to be dried, with a drying temperature of 140~160° C., preferably 150° C.

Further, in Step (f), a firing temperature is 1175~1185° C., and a firing cycle is 60~70 min.

Further, in Step (g), the polishing is carried out through a soft-mold brush-polishing technology.

Further, in Step (a), the green body layer is press-molded through a concave-convex mold.

Further, in Step (d), the antiskid and wear-resistant glaze is silk-screen printed, with a silk screen having 75~85 meshes, preferably 80 meshes.

Further, in Step (e), the easy-to-clean protection glaze is applied in a linear glaze pouring manner, with an application amount of 300~350 $g/m^2$, preferably 321 $g/m^2$.

Beneficial effects of the embodiments of the present disclosure, for example, include:

The antiskid and wear-resistant glaze provided in the present disclosure mainly consists of three raw materials, namely, the antiskid and wear-resistant particles, the printing paste and sodium tripolyphosphate, and through reasonable cooperation of various raw materials and various components of the antiskid and wear-resistant particles, the antiskid and wear-resistant glaze has good antiskid and wear-resistant effects, and meanwhile, also has relatively high transparency and relatively low glossiness, and renders, when being applied to the surface of ceramic products, advantages of excellent antiskid and wear-resistant effects and improvements on continuity and clearness of pattern textures of products.

For the antiskid and wear-resistant ceramic tile provided in the present disclosure, by stacking the antiskid and wear-resistant layer and the easy-to-dean protection layer in sequence on the decoration layer, the antiskid and wear-resistant ceramic tile not only has high wear-resistant strength and is not easily worn, but also renders high antiskid coefficients to the products, which can effectively prevent people from falling down and improve the safety of the products, and meanwhile, it also has excellent pollution resistance, is not prone to hide dirt, is easily cleaned, facilitates daily tending, and satisfies people's requirements to the antiskid, wear-resistant and easy-to-dean functions of the ceramic archaized tiles.

Besides, for the preparation method of an antiskid, wear-resistant and easy-to-dean ceramic tile provided in the present disclosure, by preparing and stacking in turn the green body layer, the overglaze layer, the decoration layer, the antiskid and wear-resistant layer and the easy-to-clean protection layer, the prepared antiskid, wear-resistant and easy-to-clean ceramic tile not only has high wear-resistant strength and is not easily worn, but also renders high antiskid coefficients to the products, which can effectively prevent people from falling down and improve the safety of the product, and meanwhile, it further has excellent pollution resistance, is not prone to hide dirt, is easily cleaned, facilitates daily tending, and satisfies people's requirements to the antiskid, wear-resistant and easy-to-clean functions of the ceramic archaized tiles.

BRIEF DESCRIPTION OF THE DRAWINGS

FIG. 1 is a schematic illustration of an antiskid, wear-resistant and easy-to-clean ceramic tile, in accordance with embodiments of the disclosure.

FIG. 2 is a flow diagram illustrating a method of preparing an antiskid, wear-resistant and easy-to-clean ceramic tile, in accordance with embodiments of the disclosure.

DETAILED DESCRIPTION OF EMBODIMENTS

Below embodiments of the present disclosure will be described in detail in conjunction with examples, but a person skilled in the art will understand that the following examples are merely for describing the present disclosure, and should not be considered as limiting the scope of the present disclosure. If no specific conditions are specified in the examples, they are carried out under conventional conditions or conditions recommended by manufacturers. If manufacturers of reagents or apparatuses used are not specified, they are conventional products commercially available.

The present disclosure provides an antiskid and wear-resistant glaze, mainly prepared by the following raw materials in parts by mass: 90-110 parts of antiskid and wear-resistant particles, 90-110 parts of printing paste and 0.2-0.4 part of sodium tripolyphosphate.

The antiskid and wear-resistant particles consist of the following components in parts by mass: 60-70 parts of $SiO_2$, 20-30 parts of $Al_2O_3$, 0.01-1 part of $Fe_2O_3$, 0.1-2 parts of $TiO_2$, 1-5 parts of $Na_2O$, 1-10 parts of $K_2O$, 0.01-1 part of $MgO$, 0.1-5 parts of $CaO$, and 0.1-2 parts of ignition loss.

Unless otherwise indicated, various products in the present disclosure have the same mass basis, for example, the antiskid and wear-resistant glaze and the antiskid and wear-resistant particles have the same mass basis, for example, both being 1 gram.

It should be noted that the ignition loss is a common technical term in the field of ceramics, and as being conventionally understood in the prior art, it refers to a ratio of a weight of raw materials after being burnt to a weight of the raw materials before being burnt.

The above antiskid and wear-resistant particles mainly serve antiskid and wear-resistant functions, the printing paste mainly serves a function of adjusting the viscosity of the antiskid and wear-resistant glaze, and the sodium tripolyphosphate mainly serves a function of adjusting suspension dispersibility of the antiskid and wear-resistant particles. The above antiskid and wear-resistant glaze, mainly consisting of three raw materials, namely, the antiskid and wear-resistant particles, the printing paste and the sodium tripolyphosphate, has good antiskid and wear-resistant effects through reasonable cooperation of various raw materials and various components of the antiskid and wear-resistant particles, and meanwhile also has relatively high transparency and relatively low glossiness, and renders when being applied to the surface of ceramic products advantages of excellent antiskid and wear-resistant effects and improvements on continuity and clearness of pattern textures of the products.

In a preferred embodiment, the printing paste mainly consists of the following components in parts by mass: 2-3 parts of sodium carboxymethylcellulose, 40-60 parts of ethylene glycol and 40-60 parts of water. The antiskid and wear-resistant glaze prepared by the printing paste with the above specific components and contents has better antiskid performances and wear-resistant performances.

A preparation method of the above antiskid and wear-resistant glaze includes the following steps: (a) melting a well-mixed silicate material of a formula amount containing elements Si, Al, Fe, Ti, Na, K, Mg and Ca, then water quenching and smashing the melted silicate material to obtain antiskid and wear-resistant particles; and (b) mixing well the antiskid and wear-resistant particles, the printing paste and the sodium tripolyphosphate of formula amounts to obtain the antiskid and wear-resistant glaze.

The above preparation method of antiskid and wear-resistant glaze is simple in technology and controllable, and the obtained antiskid and wear-resistant particles have higher hardness. Therefore, the obtained antiskid and wear-resistant glaze has better skid resistance and wear resistance, and meanwhile has relatively high transparency and relatively low glossiness, and renders when being applied to the surface of the ceramic products advantages of excellent antiskid and wear-resistant effects and improvements on continuity and clearness of pattern textures of the products.

The above silicate material mainly consists of the following raw materials in parts by mass: 10-20 parts of aluminum oxide, 35-45 parts of potassium feldspar, 1-10 parts of sodium carbonate, 35-45 parts of quartz and 1-8 parts of calcite. Further preferably, the above silicate material mainly consists of the following raw materials in parts by mass: 15 parts of aluminum oxide, 40 parts of potassium feldspar, 2 parts of sodium carbonate, 38 parts of quartz and 5 parts of calcite.

The antiskid and wear-resistant particles prepared by the silicate material with the above formula have the advantages of a moderate softening temperature, easy sintering, high transparency, high glossiness and good antiskid effect.

The present disclosure provides an antiskid, wear-resistant and easy-to-clean ceramic tile, including, from the bottom up, (1) a green body layer, (2) an overglaze layer, (3) a decoration layer, (4) an antiskid and wear-resistant layer and (5) an easy-to-clean protection layer provided in sequence, as shown in FIG. 1. The antiskid and wear-resistant layer is prepared by an antiskid and wear-resistant glaze, the antiskid and wear-resistant glaze is mainly prepared by antiskid and wear-resistant particles, and the antiskid and wear-resistant particles consist of the following components in parts by mass: 60~70 parts of $SiO_2$, 20~30 parts of $Al_2O_3$, 0.01~1 part of $Fe_2O_3$, 0.1~2 parts of $TiO_2$, 1~5 parts of $Na_2O$, 1~10 parts of $K_2O$, 0.01~1 part of MgO, 0.1~5 parts of CaO and 0.1~2 parts of ignition loss, with the sum of all the components being 100 parts. The easy-to-dean protection layer is prepared by an easy-to-dean protection glaze, the easy-to-clean protection glaze is mainly prepared by easy-to-dean protection particles, and the easy-to-dean protection particles consist of the following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2O$, 2~6 parts of $K_2O$, 0.05~0.3 part of MgO, 0.5~3 parts of CaO and 0.05~0.3 part of ignition loss, with the sum of all the components being 100 parts.

For the antiskid and wear-resistant ceramic tile provided in the present disclosure, by stacking the antiskid and wear-resistant layer and the easy-to-dean protection layer in turn on the decoration layer, the antiskid and wear-resistant ceramic tile not only has high wear-resistant strength and is not easily worn, but also renders high antiskid coefficients to products, which can effectively prevent people from falling down and improve the safety of the products, and meanwhile, it also has excellent pollution resistance, is not prone to hide dirt, is easily cleaned, facilitates daily tending, and satisfies people's requirements to the antiskid, wear-resistant and easy-to-clean functions of the ceramic archaized tiles.

Next, the green body layer, the overglaze layer, the decoration layer, the antiskid and wear-resistant layer and the easy-to-dean protection layer will be illustrated one by one.

(1) The Green Body Layer

In a preferred embodiment of the present disclosure, the green body layer is prepared by a blank, and the blank is mainly prepared by the following raw materials in parts by mass: 18~22 parts of quartz sand, 12~18 parts of potassium and sodium sand, 16~20 parts of water washed mud, 9~13 parts of white mud, 28~33 parts of potassium sand, 0.5~1.5 parts of bentonite and 2~3 parts of black talc.

The green body layer provided in the present disclosure is prepared by the blank made through synergistic cooperation of quartz sand, potassium and sodium sand, water washed mud, white mud, potassium sand, bentonite and black talc, such that the green body layer formed thereby has good mechanical strength. In order to ensure the flatness and waved deformation of the antiskid, wear-resistant and easy-to-dean ceramic tile, the blank has an aluminum content of about 21%, and a whiteness of about 35 degrees. The blank is treated in a manner of wet ball milling, for a ball milling period of 11~12 hours. The blank has a moisture content of 6~6.5%, and granular compositions thereof comprise: particles of more than 20 meshes 0~1.5%, particles of 20~40 meshes 30~60%, particles of 20~60 meshes 72~88%, particles of less than 100 meshes 0~6%, and particles of 60~100 meshes as balance.

In the blank of the green body layer provided in a preferred embodiment of the present disclosure, typical but non-limited parts by mass of the quartz sand are, for example, 18, 18.2, 18.4, 18.6, 19, 19.2, 19.4, 19.6, 19.8, 20, 20.2, 20.4, 20.6, 20.8, 21, 21.2, 21.4, 21.6, 21.8 or 22 parts, or a range value between any two of them; typical but non-limited parts by mass of the potassium and sodium sand are, for example, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8 or 18 parts, or a range value between any two of them; typical but non-limited parts by mass of the water washed mud are, for example, 16, 16.2, 16.4, 16.6, 16.8, 17, 17.2, 17.4, 17.6, 17.8, 18, 18.2, 18.4, 18.6, 18.8, 19, 19.2, 19.4, 19.6, 19.8 or 20 parts, or a range value between any two of them; typical but non-limited parts by mass of the white mud are, for example, 9.2, 9.4, 9.6, 9.8, 10, 10.2, 10.4, 10.6, 10.8, 11, 11.2, 11.4, 11.6, 11.8, 12, 12.2, 12.4, 12.6, 12.8 or 13 parts, or a range value between any two of them; typical but non-limited parts by mass of the potassium sand are, for example, 28.2, 28.4, 28.6, 28.8, 29, 29.2, 29.4, 29.6, 29.8, 30, 30.2, 30.4, 30.6, 30.8, 31, 31.2, 31.4, 31.6, 31.8, 32, 32.2, 32.4, 32.6, 32.8 or 33 parts, or a range value between any two of them; typical but non-limited parts by mass of the bentonite are, for example, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45 or 1.5 parts, or a range value between any two of them; and typical but non-limited parts by mass of the black talc are, for example, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95 or 3, or a range value between any two of them.

(2) The Overglaze Layer

The overglaze layer can improve the mechanical strength of the antiskid, wear-resistant and easy-to-clean ceramic tile, and reduce the moisture absorption of the green body.

In a preferred embodiment of the present disclosure, the overglaze layer is mainly prepared by an overglaze, and the overglaze is mainly prepared by the following raw materials in parts by mass: 20~30 parts of potassium feldspar, is 15~30 parts of quartz, 15~25 parts of nepheline, 5~10 parts of calcined kaolin, 5~15 parts of aluminum oxide, 1~8 parts of wollastonite, 0.1~2 parts of zinc oxide, 10~30 parts of zirconium silicate, 10~20 parts of columnar kaolin, 0.1~0.3 part of sodium humate, 0.1~0.3 part of sodium carboxymethylcellulose and 0.1~0.3 part of sodium tripolyphosphate.

In the overglaze provided in a preferred embodiment of the present disclosure, the potassium feldspar, the quartz, nepheline, the calcined kaolin, the aluminum oxide, the wollastonite, the zinc oxide, the zirconium silicate, the columnar kaolin, the sodium humate, the sodium carboxymethylcellulose and the sodium tripolyphosphate synergistically cooperate, such that the overglaze layer not only has good mechanical strength, but also can reduce the moisture absorption of the green body layer.

In the raw materials for preparing the overglaze provided in a preferred embodiment of the present disclosure, typical but non-limited parts by mass of the potassium feldspar are, for example, 20, 21, 22, 23, 24, 25, 26, 27, 28, 29 or 30 parts, or a range value between any two of them; typical but non-limited parts by mass of the quartz are, for example, 15, 15.5, 16, 16.5, 17, 17.5, 18, 18.5, 19, 19.5 or 20 parts, or a range value between any two of them; typical but non-limited parts by mass of the nepheline are, for example, 15, 16, 17, 18, 19, 20, 21, 22, 23, 24 or 25 parts, or a range value between any two of them; typical but non-limited parts by mass of the calcined kaolinare, for example, 5, 5.5, 6, 6.5, 7, 7.5, 8, 8.5, 9, 9.5 or 10 parts, or a range value between any two of them; typical but non-limited parts by mass of the aluminum oxide are, for example, 5, 6, 7, 8, 9, 10, 11, 12, 13, 14 or 15 parts, or a range value between any two of them; typical but non-limited parts by mass of the wollastoniteare, for example, 1, 1.5, 2, 2.5, 3, 3.5, 4, 4.5, 5, 5.5, 6, 6.5, 7, 7.5 or 8 parts, or a range value between any two of them; typical but non-limited parts by mass of the zirconium silicateare, for example, 10, 11, 12, 13, 14, 15, 16, 17, 18, 19, 20, 21, 22, 23, 24, 25, 26, 27, 28, 29 or 30 parts, or a range value between any two of them; typical but non-limited parts by mass of the columnar kaolin are, for example, 10, 11, 12, 13, 14, 15, 16, 17, 18, 19 or 20 parts, or a range value between any two of them; typical but non-limited parts by mass of the sodium humate are, for example, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them; typical but non-limited parts by mass of the sodium carboxymethylcelluloseare, for example, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them; and typical but non-limited parts by mass of the sodium tripolyphosphate are, for example, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them.

In the overglaze provided in a preferred embodiment of the present disclosure, through synergistic cooperation of potassium feldspar, quartz, nepheline, calcined kaolin, aluminum oxide, wollastonite, zinc oxide, zirconium silicate, columnar kaolin, sodium humate, sodium carboxymethylcellulose and sodium tripolyphosphate of specific parts by mass, the overglaze layer not only has good mechanical strength, but also can reduce the moisture absorption of the green body layer.

(3) The Decoration Layer

The decoration layer can enrich the diversity of patterns on a surface of the ceramic tile, such that the ceramic tile is more beautiful. Pattern textures of the decoration layer and of the antiskid and wear-resistant layer are staggered with each other, thus being able to increase varied layering and stereoscopic effects, and creating the effect that some parts of the pattern textures are faintly visible, as if they grow from the tile.

(4) The Antiskid and Wear-Resistant Layer The antiskid and wear-resistant layer can enable the ceramic tile to have good antiskid and wear-resistant effects, and through interaction of this antiskid and wear-resistant layer and the easy-to-clean protection layer, light and shadow contrast can be created on the surface of the product, thus enriching the layering of the product and upgrading the product.

In the present disclosure, the antiskid and wear-resistant layer is prepared by an antiskid and wear-resistant glaze, the antiskid and wear-resistant glaze is mainly prepared by antiskid and wear-resistant particles, and $SiO_2$, $Al_2O_3$, $Fe_2O_3$, $TiO_2$, $Na_2O$, $K_2O$, MgO and CaO in specific parts by mass synergistically cooperate in the antiskid and wear-resistant particles, such that the antiskid and wear-resistant layer prepared by the antiskid and wear-resistant glaze has good wear-resistant performance and antiskid performance, and is not easily worn or scratched, thus the antiskid, wear-resistant and easy-to-clean ceramic tile is more beautiful, moreover, it can effectively prevent people from falling down due to water present on the surface, and improve the safety performance of the product.

In the antiskid and wear-resistant particles provided in the present disclosure, typical but non-limited parts by mass of $SiO_2$ are, for example, 60, 60.5, 61, 61.5, 62, 62.5, 63, 63.5, 64, 64.5, 65, 65.5, 66, 66.5, 67, 67.5, 68, 68.5, 69, 69.5 or 70 parts, or a range value between any two of them; typical but non-limited parts by mass of $Al_2O_3$ are, for example, 20.5, 21, 21.5, 22, 22.5, 23, 23.5, 24, 24.5, 25, 25.5, 26, 26.5, 27, 27.5, 28, 28.5, 29, 29.5 or 30 parts, or a range value between any two of them; typical but non-limited parts by mass of $Fe_2O_3$ are, for example, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095 or 0.1 parts, or a range value between any two of them; typical but non-limited parts by mass of $TiO_2$ are, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 parts, or a range value between any two of them; typical but non-limited parts by mass of $Na_2O$ are, for example, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8 or 5 parts, or a range value between any two of them; typical but non-limited parts by mass of $K_2O$ are, for example, 1, 1.5, 2, 2.5, 3, 3.5, 4, 4.5, 5, 5.5, 6, 6.5, 7, 7.5, 8, 8.5, 9, 9.5 or 10 parts, or a range value between any two of them; typical but non-limited parts by mass of MgO are, for example, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1 part, or a range value between any two of them; typical but non-limited parts by mass of CaO are, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 parts, or a range value between any two of them; typical but non-limited parts by mass of the ignition loss are, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2, or a range value between any two of them.

$SiO_2$, $Al_2O_3$, $Fe_2O_3$, $TiO_2$, $Na_2O$, $K_2O$, MgO and CaO in specific parts by mass synergistically cooperate in the antiskid and wear-resistant particles, such that the antiskid and wear-resistant particles not only have good heat-resistant performance, wear-resistant performance and antiskid performance, and are not easily worn or scratched even under high temperatures, but also have relatively high transparency and relatively low glossiness, thus ensuring the continuity and clearness of pattern textures of the decoration layer of the antiskid, wear-resistant and easy-to-clean ceramic tile, and improving the aesthetics and safety of the product.

In the present disclosure, specifically, the above components ($SiO_2$, $Al_2O_3$, $Fe_2O_3$, $TiO_2$, $Na_2O$, $K_2O$, MgO and CaO) of the antiskid and wear-resistant particles are mainly prepared by the following raw materials in parts by mass: 12-18 parts of aluminum oxide, 35-45 parts of potassium feldspar, 0.1-3 parts of sodium carbonate, 1-8 parts of calcite and 35-40 parts of quartz.

In the raw materials for preparing the antiskid and wear-resistant particles provided in the present disclosure, typical but non-limited parts by mass of the aluminum oxide are, for example, 12, 12.5, 13, 13.5, 14, 14.5, 15, 15.5, 16, 16.5, 17, 17.5 or 18 parts, or a range value between any two of them; typical but non-limited parts by mass of the potassium feldspar are, for example, 35, 35.5, 36, 36.5, 37, 37.5, 38, 38.5, 39, 39.5, 40, 40.5, 41, 41.5, 42, 42.5, 43, 43.5, 44, 44.5 or 45 parts, or a range value between any two of them; typical but non-limited parts by mass of the quartz are, for example, 35, 35.5, 36, 36.5, 37, 37.5, 38, 38.5, 39 or 40 parts, or a range value between any two of them; typical but non-limited parts by mass of the calcite are, for example, 1, 1.5, 2, 2.5, 3, 3.5, 4, 4.5, 5, 5.5, 6, 6.5, 7, 7.5 or 8 parts, or a range value between any two of them; typical but non-limited parts by mass of the sodium carbonate are, for example, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 parts, or a range value between any two of them.

In the present disclosure, through the cooperation of the aluminum oxide, the potassium feldspar, the sodium carbonate, the quartz and the calcite in specific parts by mass, the antiskid and wear-resistant particles formed after sintering, containing $SiO_2$, $Al_2O_3$, $Fe_2O_3$, $TiO_2$, $Na_2$, $K_2O$, MgO and CaO in specific parts by mass, not only have good heat-resistant performance, wear-resistant performance and antiskid performance, and are not easily worn or scratched even under high temperatures, but also have relatively high transparency and relatively low glossiness.

As mentioned in the above text, the main raw materials of the antiskid and wear-resistant glaze further includes, in parts by mass, 90~110 parts of the printing paste and 0.2~0.4 part of the sodium tripolyphosphate, wherein the printing paste mainly consists of the following components in parts by mass: 2~3 parts of sodium carboxymethylcellulose, 40~60 parts of ethylene glycol and 40~60 parts of water.

In the antiskid and wear-resistant glaze provided in a preferred embodiment of the present disclosure, typical but non-limited parts by mass of the printing paste are, for example, 91, 92, 93, 94, 95, 96, 97, 98, 99, 100, 101, 102, 103, 104, 105, 106, 107, 108, 109 or 110 parts, or a range value between any two of them; and typical but non-limited parts by mass of the sodium tripolyphosphate are, for example, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39 or 0.4 parts, or a range value between any two of them.

In a preferred embodiment of the present disclosure, the printing paste, the sodium tripolyphosphate and the antiskid and wear-resistant particles in specific parts by mass synergistically cooperate in the antiskid and wear-resistant glaze, such that the antiskid and wear-resistant glaze not only has the antiskid effect under high temperatures, but also has relatively high transparency and relatively low glossiness, thus ensuring the continuity of pattern textures of the decoration layer, then it can be uniformly covered on the surface of the decoration layer through silk-screen printing to form the antiskid and wear-resistant layer, improving the wear resistance and skid resistance of the product.

In the printing paste provided in a preferred embodiment of the present disclosure, typical but non-limited parts by mass of the sodium carboxymethylcellulose are, for example, 2, 2.1, 2.2, 2.3, 2.4, 2.5, 2.6, 2.7, 2.8, 2.9 or 3 parts, or a range value between any two of them; typical but non-limited parts by mass of the ethylene glycol are, for example, 41, 42, 43, 44, 45, 46, 47, 48, 49, 50, 51, 52, 53, 54, 55, 56, 57, 58, 59 or 60 parts, or a range value between any two of them; and typical but non-limited parts by mass of water are, for example, 41, 42, 43, 44, 45, 46, 47, 48, 49, 50, 51, 52, 53, 54, 55, 56, 57, 58, 59 or 60 parts, or a range value between any two of them.

In a preferred embodiment of the present disclosure, the printing paste, prepared through the synergistic cooperation of the sodium carboxymethylcellulose, the ethylene glycol and water, has suitable viscosity, so as to facilitate the application of the antiskid and wear-resistant glaze.

In a preferred embodiment of the present disclosure, the granular compositions of the antiskid and wear-resistant particles comprise: particles of 80~120 meshes 20%~30%, particles of 120~180 meshes 50%~60%, and particles of less than 200 meshes as balance. Preferably, the antiskid and wear-resistant particles have a specific gravity of 1.2~1.8 g/cm$^3$ and a flow velocity of 80~100 seconds.

It should be indicated that percentage contents (%) in the present disclosure are all mass percentage contents.

By choosing the above granular compositions for the antiskid and wear-resistant particles, there are fewer gaps among the particles, and the antiskid and wear-resistant particles are distributed more tightly and more uniformly after being applied on the product surface. By choosing the above specific gravity and flow velocity for the antiskid and wear-resistant particles, the antiskid and wear-resistant glaze has good flowability, can smoothly pass through a silk screen without sticking to the screen, and further improves the printing efficiency and the antiskid and wear-resistant performances.

In the above antiskid and wear-resistant particles, a typical but non-limited content of particles of 80-120 meshes is: 20%, 21%, 22%, 23%, 24%, 25%, 26%, 27%, 28%, 29% or 30%, or a range value between any two of them. A typical but non-limited content of particles of 120-180 meshes is: 50%, 51%, 52%, 53%, 54%, 55%, 56%, 57%, 58%, 59% or 60%, or a range value between any two of them. By using the above granular compositions for the antiskid and wear-resistant particles, there can be fewer gaps among the particles, and the antiskid and wear-resistant particles are distributed more tightly and more uniformly after being applied on the product surface.

In the present disclosure, the above antiskid and wear-resistant particles have a typical but non-limited specific gravity of 1.2 g/cm$^3$, 1.3 g/cm$^3$, 1.4 g/cm$^3$, 1.5 g/cm$^3$, 1.6 g/cm$^3$, 1.7 g/cm$^3$ or 1.8 g/cm$^3$, or a range value between any two of them. A typical but non-limited flow velocity is: 80 seconds, 81 seconds, 82 seconds, 83 seconds, 84 seconds, 85 seconds, 86 seconds, 87 seconds, 88 seconds, 89 seconds, 90 seconds, 91 seconds, 92 seconds, 93 seconds, 94 seconds, 95 seconds, 96 seconds, 97 seconds, 98 seconds, 99 seconds or 100 seconds, or a range value between any two of them. The above specific gravities and flow velocities can enable the antiskid and wear-resistant glaze to have good flowability, smoothly pass through the silk screen without sticking to the screen, and further improve the printing efficiency and the antiskid and wear-resistant performances.

(5) The Easy-to-Clean Protection Layer

In the present disclosure, the easy-to-clean protection layer is mainly prepared by an easy-to-clean protection glaze, the easy-to-clean protection glaze is mainly prepared by easy-to-clean protection particles, and in the easy-to-clean protection particles, $SiO_2$, $Al_2O_3$, $Fe_2O_3$, $Ti_2O$, $Na_2O$, $K_2O$, MgO and CaO in specific parts by mass synergistically cooperate, such that the easy-to-dean protection layer prepared by the easy-to-clean protection glaze not only has good pollution resistance, but also is not prone to hide dirt and is easily cleaned, thus it is easier to tend.

In the easy-to-clean protection particles provided in the present disclosure, typical but non-limited parts by mass of $SiO_2$ are, for example, 60, 60.5, 61, 61.5, 62, 62.5, 63, 63.5, 64, 64.5, 65, 65.5, 66, 66.5, 67, 67.5, 68, 68.5, 69, 69.5 or 70 parts, or a range value between any two of them; typical but non-limited parts by mass of $Al_2O_3$ are, for example, 15, 15.5, 16, 16.5, 17, 17.5, 18, 18.5, 19, 19.5, 20, 20.5, 21, 21.5, 22, 22.5, 23, 23.5, 24, 24.5 or 25 parts, or a range value between any two of them; typical but non-limited parts by mass of $Fe_2O_3$ are, for example, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them; typical but non-limited parts by mass of $TiO_2$ are, for example, 0.01, 0.02, 0.03, 0.04, 0.05, 0.06, 0.07, 0.08, 0.09 or 0.1 parts, or a range value between any two of them; typical but non-limited parts by mass of $Na_2O$ are, for example, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9 or 8 parts, or a range value between any two of them; typical but non-limited parts by mass of $K_2O$ are, for example, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9 or 6 parts, or a range value between any two of them; typical but non-limited parts by mass of MgO are, for example, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them; and typical but non-limited parts by mass of the ignition loss are, for example, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29 or 0.3 parts, or a range value between any two of them.

$SiO_2$, $Al_2O_3$, $Fe_2O_3$, $TiO_2$, $Na_2O$, $K_2O$, MgO and CaO in specific parts by mass synergistically cooperate in the easy-to-clean protection particles, such that the easy-to-clean protection particles not only have a relatively high softening and melting temperature and a relatively wide sintering (firing) range, but also can have relatively high glossiness after the sintering, such that the product has pollution resistance and easy-to-clean property, then it is easier to tend.

In the present disclosure, specifically, the above components ($SiO_2$, $Al_2O_3$, $Fe_2O_3$, $TiO_2$, $Na_2O$, $K_2O$, MgO and CaO) of the easy-to-clean protection particles are mainly prepared by the following raw materials in parts by mass: 10-15 parts of aluminum oxide, 40-45 parts of potassium feldspar, 8-13 parts of sodium carbonate, 7-12 parts of zinc oxide and 20-30 parts of quartz.

In the raw materials provided in the present disclosure for preparing the easy-to-clean protection particles, typical but non-limited parts by mass of the aluminum oxide are, for example, 10, 10.5, 11, 11.5, 12, 12.5, 13, 13.5, 14, 14.5 or 15 parts, or a range value between any two of them; typical but non-limited parts by mass of the potassium feldspar are, for example, 40, 40.5, 41, 41.5, 42, 42.5, 43, 43.5, 44, 44.5 or 45 parts, or a range value between any two of them; typical but non-limited parts by mass of the sodium carbonate are, for example, 8, 8.5, 9, 9.5, 10, 10.5, 11, 11.5, 12, 12.5 or 13 parts, or a range value between any two of them; typical but non-limited parts by mass of the zinc oxide are, for example, 7, 7.5, 8, 8.5, 9, 9.5, 10, 10.5, 11, 11.5 or 12 parts, or a range value between any two of them; and typical but non-limited parts by mass of the quartz are, for example, 20, 20.5, 21, 21.5, 22, 22.5, 23, 23.5, 24, 24.5, 25, 25.5, 26, 26.5, 27, 27.5, 28, 28.5, 29, 29.5 or 30 parts, or a range value between any two of them.

In the present disclosure, the aluminum oxide, the potassium feldspar, the sodium carbonate, the zinc oxide and the quartz in specific parts by mass synergistically cooperate, such that the easy-to-clean protection particles formed after the sintering, containing $SiO_2$, $Al_2O_3$, $Fe_2O_3$, $TiO_2$, $Na_2O$, $K_2O$, MgO and CaO in specific parts by mass, not only have a relatively high softening and melting temperature and a relatively wide sintering range, but also can have relatively high glossiness after the sintering.

In a preferred embodiment of the present disclosure, the main raw materials of the easy-to-clean protection glaze further comprise, in parts by mass, 230-270 parts of printing ink and 20-40 parts of transparent glaze, wherein the printing ink consists of the following components in parts by mass: 1~2 parts of sodium carboxymethylcellulose, 20~40 parts of ethylene glycol, 1~5 parts of bentonite and 60~80 parts of water.

In the easy-to-clean protection glaze provided in a preferred embodiment of the present disclosure, typical but non-limited parts by mass of the printing ink are, for example, 230, 232, 234, 236, 238, 240, 242, 244, 246, 248, 250, 252, 254, 256, 258, 260, 262, 264, 266, 268, 270, 272, 274, 276, 278 or 280 parts, or a range value between any two of them; and typical but non-limited parts by mass of the transparent glaze are, for example, 21, 22, 23, 24, 25, 26, 27, 28, 29, 30, 31, 32, 33, 34, 35, 36, 37, 38, 39 or 40, or a range value between any two of them.

The printing ink, the transparent glaze and the easy-to-clean protection particles in specific parts by mass synergistically cooperate in the easy-to-clean protection glaze provided in a preferred embodiment of the present disclosure, such that the easy-to-clean protection glaze can be uniformly covered on the surface of the antiskid and wear-resistant layer in a glaze pouring manner, and maintain relatively high glossiness, thus the antiskid, wear-resistant and easy-to-clean ceramic tile provided in the present disclosure is more beautiful and easier to tend.

In the printing ink provided in a preferred embodiment of the present disclosure, typical but non-limited parts by mass of the sodium carboxymethylcellulose are, for example, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95 or 2 parts, or a range value between any two of them; typical but non-limited parts by mass of the ethylene glycol are, for example, 20, 21, 22, 23, 24, 25, 26, 27, 28, 29, 30, 31, 32, 33, 34, 35, 36, 37, 38, 39 or 40 parts, or a range value between any two of them; typical but non-limited parts by mass of the bentonite are, for example, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8 or 5 parts, or a range value between any two of them; and typical but non-limited parts by mass of water are, for example, 61, 62, 63, 64, 65, 66, 67, 68, 69, 70, 71, 72, 73, 74, 75, 76, 77, 78, 79 or 80 parts, or a range value between any two of them.

In a preferred embodiment of the present disclosure, the sodium carboxymethylcellulose, the ethylene glycol, the bentonite and water synergistically cooperate in the printing ink, such that the prepared printing ink has suitable viscosity, thus the prepared easy-to-clean protection glaze not only can be quickly poured, but also can uniformly cover the surface of the antiskid and wear-resistant layer.

In a preferred embodiment of the present disclosure, the transparent glaze consists of the following components in parts by mass: 12~16 parts of soda feldspar, 20~24 parts of potassium feldspar, 13~17 parts of calcined talc, 7~11 parts of limestone, 8~12 parts of barium carbonate and 1~5 parts of zinc oxide.

In the transparent glaze provided in a preferred embodiment of the present disclosure, typical but non-limited parts by mass of the soda feldspar are, for example, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8 or 16 parts, or a range value between any two of them; typical but non-limited parts by mass of the potassium feldspar are, for example, 20.2, 20.4, 20.6, 20.8, 21, 21.2, 21.4, 21.6, 21.8, 22, 22.2, 22.4, 22.6, 22.8, 23, 23.2, 23.4, 23.6, 23.8 or 24 parts, or a range value between any two of them; typical but non-limited parts by mass of the calcined talc are, for example, 13.2, 13.4, 13.6, 13.8, 14, 14.2, 14.4, 14.6, 14.8, 15, 15.2, 15.4, 15.6, 15.8, 16, 16.2, 16.4, 16.8 or 17 parts, or a range value between any two of them; typical but non-limited parts by mass of the limestone are, for example, 7, 7.2, 7.4, 7.6, 7.8, 8, 8.2, 8.4, 8.6, 8.8, 9, 9.2, 9.4, 9.6, 9.8, 10, 10.2, 10.4, 10.6, 10.8 or 11 parts, or a range value between any two of them; typical but non-limited parts by mass of the barium sulfate are, for example, 8, 8.2, 8.4, 8.6, 8.8, 9, 9.2, 9.4, 9.6, 9.8, 10, 10.2, 10.4, 10.6, 10.8, 11, 11.2, 11.4, 11.6, 11.8 or 12 parts, or a range value between any two of them; and typical but non-limited parts by mass of the zinc oxide are, for example, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8 or 5 parts, or a range value between any two of them.

In a preferred embodiment of the present disclosure, the soda feldspar, potassium feldspar, the calcined talc, the limestone, the barium carbonate and the zinc oxide in specific parts by mass synergistically cooperate in the transparent glaze, such that the transparent glaze not only can fill up the gaps among the easy-to-clean protection particles, but also meanwhile can ensure certain high-temperature viscosity, and achieve relatively good antifouling, wear-resistant and easy-to-clean effects together with the easy-to-clean protection particles.

In a preferred embodiment of the present disclosure, the granular compositions of the easy-to-clean protection particles comprise: particles of 80~120 meshes 50%~60%, particles of 120~200 meshes 20%~30%, and particles of less than 200 meshes as balance. Preferably, the easy-to-dean protection particles have a specific gravity of 1.2~1.4 g/cm$^3$.

By choosing the above granular compositions, the easy-to-clean protection particles are distributed more tightly and more uniformly after being applied on the surface of the antiskid and wear-resistant layer. By choosing the above specific gravities for the easy-to-clean protection particles, the easy-to-dean protection glaze can have good flowability, and the glaze pouring efficiency can be improved.

In the above easy-to-clean protection particles, in parts by mass, a typical but non-limited content of the particles of 80-120 meshes is: 50%, 51%, 52%, 53%, 54%, 55%, 56%, 57%, 58%, 59% or 60%, or a range value between any two of them. A typical but non-limited content of the particles of 120-200 meshes is: 20%, 21%, 22%, 23%, 24%, 25%, 26%, 27%, 28%, 29% or 30%, or a range value between any two of them.

In the present disclosure, a typical but non-limited specific gravity of the above easy-to-clean protection particles is: 1.2 g/cm$^3$, 1.22 g/cm$^3$, 1.24 g/cm$^3$, 1.26 g/cm$^3$, 1.28 g/cm$^3$, 1.3 g/cm$^3$, 1.32 g/cm$^3$, 1.34 g/cm$^3$, 1.36 g/cm$^3$, 1.38 g/cm$^3$ or 1.4 g/cm$^3$, or a range value between any two of them.

The above specific gravities can enable the easy-to-clean protection glaze to have good flowability, and improve the glaze pouring efficiency.

For the antiskid and wear-resistant ceramic tile provided in the present disclosure, by stacking the antiskid and wear-resistant layer and the easy-to-dean protection layer in turn on the decoration layer, the antiskid and wear-resistant ceramic tile not only has high wear-resistant strength and is not easily worn, but also renders high antiskid coefficients to the products which can effectively prevent people from falling down and improve the safety of the product, and meanwhile it further has excellent pollution resistance, is not prone to hide dirt, is easy to clean, facilitates daily tending, and satisfies people's requirements to the antiskid, wear-resistant and easy-to-clean functions of the ceramic archaized tiles.

As shown in FIG. 2 a preparation method of an antiskid, wear-resistant and easy-to-clean ceramic tile provided in the present disclosure includes the following steps:

(a) preparing a green body layer from a blank;

Specifically, in a preferred embodiment of the present disclosure, in Step (a), the green body layer is press-molded by a concave-convex mold.

In the above, the concave-convex mold is a texture mold matched with a design of the antiskid, wear-resistant and easy-to-clean ceramic tile, the blank is press-molded by the concave-convex mold through a pressing machine, to prepare a green body with concave-convex effects, contributing to improving the antiskid effect, layering sense and solid and thick sense of the antiskid, wear-resistant and easy-to-clean ceramic tile.

(s) primary drying;

The green body layer is placed in a drying kiln to be dried, with a drying temperature of 100~160° C., and a drying cycle of 50~70 min. By placing the green body layer in the drying kiln for drying, the moisture content of the green body layer is reduced, and the application for preparation of an overglaze layer is ensured.

It is worth noting that Step (s) is provided between Step (a) and Step (b), and is an optional step.

(b) applying an overglaze on the green body layer to form the overglaze layer;

Specifically, in a preferred embodiment of the present disclosure, in Step (b), the overglaze is applied on the green body layer in a glaze pouring manner to form the overglaze.

(c) Ink-jet printing the overglaze layer to prepare a decoration layer;

Specifically, in a preferred embodiment of the present disclosure, in Step (c), decoration printing is carried out on the overglaze layer by an ink-jet printing device, such that the antiskid and wear-resistant ceramic tile provided in the present disclosure is more beautiful and has antique effects.

(d) printing the antiskid and wear-resistant glaze on the decoration layer to form an antiskid and wear-resistant layer, wherein the antiskid and wear-resistant glaze is mainly prepared by antiskid and wear-resistant particles, and the antiskid and wear-resistant particles consist of the following components in parts by mass: 60~70 parts of $SiO_2$, 20~30 parts of $Al_2O_3$, 0.01~0.1 part of $Fe_2O_3$, 0.1~2 parts of $TiO_2$, 1~5 parts of $Na_2O$, 1~10 parts of $K_2O$, 0.1~1 parts of MgO, 0.1~5 parts of CaO and 0.1~2 parts of ignition loss;

Specifically, in a preferred embodiment of the present disclosure, in Step (d), the antiskid and wear-resistant glaze is silk-screen printed, with a silk screen having 75~85 meshes, preferably 80 meshes.

By silk-screen printing the antiskid and wear-resistant glaze, with the silk screen having 75~85 meshes, pattern textures of the silk screen, ink-jet textures of the decoration layer and mold textures of the green body layer are staggered with each other, such that the product has more varied layering and stereoscopic effects are increased (a surface area and acting points are increased, and the antiskid capacity of the product is enhanced) on the basis of original mold textures, meanwhile, staggering with the ink-jet printed patterns of the decoration layer creates the effect that some parts of the pattern textures are faintly visible, as if they grow from the tile, moreover, since the printed antiskid and wear-resistant glaze has good antiskid and wear-resistant performances, the prepared antiskid, wear-resistant and easy-to-clean ceramic tile has excellent antiskid and wear-resistant effects.

(e) Applying the easy-to-dean protection glaze on the antiskid and wear-resistant layer to form an easy-to-clean protection layer, wherein the easy-to-dean protection glaze is mainly prepared by easy-to-dean protection particles, and the easy-to-clean protection particles consist of the following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2O$, 2~6 parts of $K_2O$, 0.05~0.3 part of MgO, 0.5~3 parts of CaO and 0.05~0.3 part of ignition loss;

Specifically, in a preferred embodiment of the present disclosure, in Step (e), the easy-to-clean protection glaze is applied in a linear glaze pouring manner, with an application amount of 300~350 g/m$^2$, preferably 321 g/m$^2$.

Since the antiskid and wear-resistant layer, after being sintered, has a relatively dry surface, and dirt easily hides in fine gaps among the antiskid and wear-resistant particles, it is unfavorable to daily tending and does not satisfy requirements of hand feeling. The easy-to-clean protection glaze is applied in the glaze pouring manner so as to form the easy-to-dean protection layer, and uniformly covers the surface of the antiskid and wear-resistant layer. Then on one hand, the gaps among the antiskid and wear-resistant particles can be filled up, and on the other hand, the sintering temperature of the antiskid and wear-resistant layer also can be reduced, moreover, in places of the antiskid and wear-resistant layer where the antiskid and wear-resistant particles are not printed, gloss difference will be created with respect to places where the antiskid and wear-resistant particles are printed, thus generating light and shadow contrast, which not only achieves objects of addressing the problem of the dirt hiding and being easily cleaned, but also improves the quality of the product surface, enriches the layering of the product, and meanwhile also enhances the wear-resistant performance of the product, and upgrades the product.

In a preferred embodiment of the present disclosure, a glaze pouring amount is 300~350 $g/m^2$, preferably 321 $g/m^2$, and the prepared antiskid, wear-resistant and easy-to-clean ceramic tile is the best in aesthetics and easy-to-dean properties.

(p) secondary drying;

The green body layer, the overglaze layer, the decoration layer, the antiskid and wear-resistant layer and the easy-to-clean protection layer stacked in sequence are placed in the drying kiln to be dried, with a drying temperature of 140~160° C., preferably 150° C. By providing the secondary drying step, the product quality is ensured and the production capacity is improved. Preferably, a 30-meter pre-kiln dryer is used, and heat is supplied by waste heat in combination with a hot-blast stove, so as to save energy.

It is worth noting that Step (p) is provided between Step (e) and Step (f), and is an optional step.

(f) placing the green body layer, the overglaze layer, the decoration layer, the antiskid and wear-resistant layer and the easy-to-clean protection layer stacked in sequence in a kiln to be fired, to prepare an antiskid, wear-resistant and easy-to-clean ceramic tile green body, with a firing temperature of 1175~1185° C., and a firing cycle of 60~70 min.

By sintering the green body layer, the overglaze layer, the decoration layer, the antiskid and wear-resistant layer and the easy-to-clean protection layer stacked in sequence, the above various layers are sintered and molded in one piece to obtain the antiskid, wear-resistant and easy-to-clean ceramic tile green body.

(g) carrying out polishing and edging treatments on the antiskid, wear-resistant and easy-to-clean ceramic tile green body to obtain the antiskid, wear-resistant and easy-to-clean ceramic tile;

In a preferred embodiment of the present disclosure, in Step (g), the polishing is carried out through a soft-mold brush-polishing technology, and polishing molds are arranged in the following order 4 400-mesh soft rubber profiling molds with a pressure of 3 kilograms, 6 600-mesh soft rubber profiling molds with a pressure of 2 kilograms, 6 800-mesh soft rubber profiling molds with a pressure of 1 kilogram, 6 120-mesh abrasive brushes without pressure, 6 200-mesh abrasive brushes without pressure, 4 320-mesh abrasive brushes without pressure, 4 100-mesh sponge molds without pressure, and 8 1000-mesh soft rubber profiling molds without pressure, at a linear velocity of 10 cm/s.

After the polishing is completed, a matte liquid wax is sprayed, followed by edging to obtain a product with glossiness of 20±5 degrees.

By carrying out the soft-mold brush-polishing technology, the antiskid, wear-resistant and easy-to-clean ceramic tile is more mellow and stereoscopic, the product is upgraded, the decoration effect of the product on buildings is enhanced, thus increasing additional values, and creating more social economic benefits.

With the preparation method of the antiskid, wear-resistant and easy-to-dean ceramic tile provided in the present disclosure, by preparing in turn the stacked green body layer, the overglaze layer, the decoration layer, the antiskid and wear-resistant layer and the easy-to-clean protection layer, the prepared antiskid, wear-resistant and easy-to-clean ceramic tile not only has high wear-resistant strength and is not easily worn, but also has a high antiskid coefficient for the products, which can effectively prevent people from falling down and improve the safety of the products, and meanwhile, it also has excellent pollution resistance, is not prone to hide dirt, is easily cleaned, facilitates daily tending, and satisfies people's requirements to the antiskid, wear-resistant and easy-to-clean functions of the ceramic archaized tiles.

For the antiskid, wear-resistant and easy-to-clean ceramic tile provided in the present disclosure, sequentially by pressing the green body layer through the concave-convex mold, the primary drying, pouring glaze to form the overglaze layer, ink-jet printing the decoration layer, silk-screen printing the antiskid and wear-resistant layer, linearly pouring glaze to form an easy-to-dean dry layer, the secondary drying, firing, polishing and edging, the prepared antiskid, wear-resistant and easy-to-dean ceramic tile not only has high wear-resistant strength, is not easily worn, and can bear a wear resistance test of 12000 turns, and also renders a high antiskid coefficient to the products (the antiskid coefficient measured through a wet test is up to 0.50 or above), which can effectively prevent people from falling down and improve the safety of the products, and meanwhile, it also has excellent pollution resistance, is not prone to hide dirt, is easily cleaned, and facilitates daily tending.

For the sake of easy understanding, technical solutions provided in the present disclosure are further described in combination with examples.

Example 1

The present example provides an antiskid, wear-resistant and easy-to-clean ceramic tile, provided with, from the bottom up, a green body layer, an overglaze layer, a decoration layer, an antiskid and wear-resistant layer and an easy-to-dean protection layer in sequence.

In the above, the green body layer is prepared by a blank, the blank is mainly prepared by the following raw materials in parts by mass: 20 parts of quartz sand, 15 parts of potassium and sodium sand, 18 parts of water washed mud, 12.5 parts of white mud, 31 parts of potassium sand, 1 part of bentonite and 2.5 parts of black talc.

The overglaze layer is prepared by an overglaze, and the overglaze is prepared by the following raw materials in parts by mass: 25 parts of potassium feldspar, 23 parts of quartz, 20 parts of nepheline, 7 parts of calcined kaolin, 10 parts of aluminum oxide, 4 parts of wollastonite, 1 part of zinc oxide, 20 parts of zirconium silicate, 15 parts of columnar kaolin, 0.2 parts of sodium humate, 0.2 parts of sodium carboxymethylcellulose and 0.15 parts of sodium tripolyphosphate.

The decoration layer is prepared by ink-jet decoration and printing.

The antiskid and wear-resistant layer is prepared by an antiskid and wear-resistant glaze; the antiskid and wear-resistant glaze is prepared by the following raw materials in parts by mass: 100 parts of a printing paste, 100 parts of antiskid and wear-resistant particles, and 0.3 parts of sodium tripolyphosphate, the printing paste consists of the following components in parts by mass: 2.5 parts of sodium carboxymethylcellulose, 49 parts of ethylene glycol, and 48.5 parts of water, and the antiskid and wear-resistant particles consist of the following components in parts by mass: 60 parts of $SiO_2$, parts of $Al_2O_3$, 0.01 part of $Fe_2O_3$, 0.88 part of $TiO_2$, 5 parts of $Na_2O$, 1 part of $K_2O$, 0.11 part of MgO, 2 parts of CaO and 1 part of ignition loss.

The easy-to-dean protection layer is prepared by an easy-to-dean protection glaze, and the easy-to-dean protection glaze is prepared by the following raw materials in parts by mass: 250 parts of a printing ink, 30 parts of a transparent glaze, and 100 parts of easy-to-dean protection particles; the printing ink consists of the following components in parts by mass: 1.2 parts of sodium carboxymethylcellulose, 30 parts of ethylene glycol, 3 parts of bentonite and 70 parts of water; the transparent glaze consists of the following components in parts by mass: 14 parts of soda feldspar, 22 parts of potassium feldspar, 8 parts of calcined kaolin, 12 parts of columnar kaolin, 12 parts of quartz, 15 parts of calcined talc, 9 parts of limestone, 10 parts of barium carbonate and 3 parts of zinc oxide; and the easy-to-clean protection particles consist of the following components in parts by mass: 61.7 parts of $SiO_2$, 25 parts of $Al_2O_3$, 0.1 part of $Fe_2O_3$, 0.1 part of $TiO_2$, 4 parts of $Na_2O$, 6 parts of $K_2O$, 0.05 part of MgO, 3 parts of CaO and 0.05 part of ignition loss.

Example 2

The present example provides an antiskid, wear-resistant and easy-to-clean ceramic tile. The present example differs from Example 1 in that:

the antiskid and wear-resistant particles consist of the following components in parts by mass: 70 parts of $SiO_2$, 20 parts of $Al_2O_3$, 0.1 part of $Fe_2O_3$, 2 parts of $TiO_2$, 1 part of $Na_2O$, 5 parts of $K_2O$, 1 part of MgO, 0.8 part of CaO and 0.1 part of ignition loss; and the easy-to-clean protection particles consist of the following components in parts by mass: 70 parts of $SiO_2$, 18.59 parts of $Al_2O_3$, 0.3 parts of $Fe_2O$, 0.01 part of $TiO_2$, 8 parts of $Na_2O$, 2 parts of $K_2O$, 0.3 part of MgO, 0.5 part of CaO and 0.3 part of ignition loss.

Example 3

The present example provides an antiskid, wear-resistant and easy-to-clean ceramic tile. The present example differs from Example 1 in that:

the antiskid and wear-resistant particles consist of the following components in parts by mass: 62 parts of $SiO_2$, 25 parts of $Al_2O_3$, 0.05 part of $Fe_2O_3$, 1.5 parts of $TiO_2$, 2 parts of $Na_2$, 5 parts of $K_2O$, 0.2 part of MgO, 4 parts of CaO and 0.25 part of ignition loss; and the easy-to-clean protection particles consist of the following components in parts by mass: 68 parts of $SiO_2$, 18 parts of $Al_2O_3$, 0.2 part of $Fe_2O_3$, 0.02 part of $TiO_2$, 5 parts of $Na_2O$, 6 parts of $K_2O$, 0.1 part of MgO, 2.38 parts of CaO and 0.3 part of ignition loss.

Example 4

The present example provides an antiskid, wear-resistant and easy-to-clean ceramic tile. The present example differs from Example 1 in that:

the antiskid and wear-resistant particles consist of the following components in parts by mass: 68 parts of $SiO_2$, 20 parts of $Al_2O_3$, 0.1 part of $Fe_2O_3$, 0.5 part of $TiO_2$, 3 parts of $Na_2O$, 2.1 parts of $K_2O$, 0.8 part of MgO, 4 parts of CaO and 1.5 parts of ignition loss; and the easy-to-clean protection particles consist of the following components in parts by mass: 62.52 parts of $SiO_2$, 23 parts of $Al_2O_3$, 0.1 part of $Fe_2O_3$, 0.08 part of $TiO_2$, 7 parts of $Na_2$, 6 parts of $K_2O$, 0.2 part of MgO, 1 part of CaO and 0.1 part of ignition loss.

Example 5

The present example provides an antiskid, wear-resistant and easy-to-clean ceramic tile. The present example differs from Example 1 in that:

the antiskid and wear-resistant particles consist of the following components in parts by mass: 65 parts of $SiO_2$, 23 parts of $Al_2O_3$, 0.07 part of $Fe_2O_3$, 1.1 parts of $TiO_2$, 2 parts of $Na_2O$, 4.53 parts of $K_2O$, 0.5 parts of MgO, 3 parts of CaO and 0.8 parts of ignition loss; and the easy-to-clean protection particles consist of the following components in parts by mass: 67 parts of $SiO_2$, 20 parts of $Al_2O_3$, 0.2 part of $Fe_2O_3$, 0.05 parts of $TiO_2$, 5.55 parts of $Na_2O$, 5 parts of $K_2O$, 0.1 part of MgO, 2 parts of CaO and 0.1 part of ignition loss.

Example 6

The present example provides an antiskid, wear-resistant and easy-to-clean ceramic tile. The present example differs from Example 1 in that:

the antiskid and wear-resistant particles consist of the following components in parts by mass: 66 parts of $SiO_2$, 22 parts of $Al_2O_3$, 0.09 part of $Fe_2O_3$, 0.9 part of $TiO_2$, 2.5 parts of $Na_2O$, 5 parts of $K_2O$, 0.3 part of MgO, 2.51 parts of CaO and 0.7 part of ignition loss; and the easy-to-clean protection particles consist of the following components in parts by mass: 66 parts of $SiO_2$, 22 parts of $Al_2O_3$, 0.15 part of $Fe_2O_3$, 0.07 parts of $TiO_2$, 5.93 parts of $Na_2O$, 4 parts of $K_2O$, 0.15 part of MgO, 1.5 parts of CaO and 0.2 part of ignition loss.

Example 7

The present example provides an antiskid, wear-resistant and easy-to-clean ceramic tile. The present example differs from Example 1 in that:

the antiskid and wear-resistant particles consist of the following components in parts by mass: 65.87 parts of $SiO_2$, 22.86 parts of $Al_2O_3$, 0.08 parts of $Fe_2O_3$, 0.99 parts of $TiO_2$, 2.22 parts of $Na_2O$, 4.11 parts of $K_2O$, 0.43 part of MgO, 2.69 parts of CaO and 0.75 parts of ignition loss; and the easy-to-clean protection particles consist of the following components in parts by mass: 66.38 parts of $SiO_2$, 20.99 parts of $Al_2O_3$, 0.17 part of $Fe_2O_3$, 0.06 part of $TiO_2$, 6 parts of $Na_2O$, 4.42 parts of $K_2O$, 0.13 part of MgO, 1.7 parts of CaO and 0.15 part of ignition loss.

Example 8

The present example provides an antiskid, wear-resistant and easy-to-clean ceramic tile. The present example differs from Example 7 in that the antiskid and wear-resistant glaze is prepared by the following raw materials in parts by mass: 150 parts of antiskid and wear-resistant particles, 50 parts of a printing paste and 1 part of sodium tripolyphosphate.

Example 9

The present example provides an antiskid, wear-resistant and easy-to-clean ceramic tile. The present example differs from Example 7 in that the antiskid and wear-resistant glaze is prepared by the following raw materials in parts by mass: 50 parts of antiskid and wear-resistant particles, 150 parts of a printing paste and 0.1 part of sodium tripolyphosphate.

Example 10

The present example provides an antiskid, wear-resistant and easy-to-clean ceramic tile. The present example differs from Example 7 in that the easy-to-dean protection glaze is prepared by the following raw materials in parts by mass: 60 parts of easy-to-clean protection particles, 310 parts of a printing ink and 10 parts of a transparent glaze.

Example 11

The present example provides an antiskid, wear-resistant and easy-to-clean ceramic tile. The present example differs from Example 7 in that the easy-to-clean protection glaze is prepared by the following raw materials in parts by mass: 150 parts of easy-to-clean protection particles, 180 parts of a printing ink and 50 parts of a transparent glaze.

Example 12

The present example provides an antiskid, wear-resistant and easy-to-clean ceramic tile. The present example differs from Example 7 in that:
the antiskid and wear-resistant glaze is prepared by the following raw materials in parts by mass: 150 parts of antiskid and wear-resistant particles, 50 parts of a printing paste and 0.3 part of sodium tripolyphosphate; and
the easy-to-clean protection glaze is prepared by the following raw materials in parts by mass: 150 parts of easy-to-clean protection particles, 180 parts of a printing ink and 50 parts of a transparent glaze.

Example 13

The present example provides a preparation method of an antiskid, wear-resistant and easy-to-clean ceramic tile, and all of the antiskid, wear-resistant and easy-to-clean ceramic tiles provided in the above Examples 1-12 are prepared according to the following steps:
(a) firstly, preparing a blank in a manner of wet ball milling into a slurry in which a moisture content is 6.3%, granular compositions comprise particles of more than 20 meshes 1%, particles of 20~40 meshes 45%, particles of 20~60 meshes 80%, particles of less than 100 meshes 3%, and particles of 60~100 meshes as balance; then press-molding the slurry by a concave-convex mold to form a green body layer with concave-convex effects;
(s) placing the green body layer in a drying kiln to undergo primary drying, with a drying temperature of 130° C. and a drying cycle of 60 min;
(b) applying, in a glaze pouring manner, an overglaze on the green body layer having undergone the primary drying, to form an overglaze layer, wherein the overglaze is subjected to wet ball milling, and then subjected to glaze pouring after 4.5 hours of the ball milling, wherein a velocity of the glaze pouring is 321 g/m$^2$;
(c) performing decorating and printing on the overglaze layer by an ink-jet printing device to form a decoration layer;
(d) silk-screen printing an antiskid and wear-resistant glaze on the decoration layer to prepare an antiskid and wear-resistant layer;
(e) applying an easy-to-clean protection glaze on the antiskid and wear-resistant layer in a linear glaze pouring manner at a glaze pouring velocity of 321 g/m$^2$ to prepare an easy-to-clean protection layer, wherein granular compositions of the easy-to-clean protection particles comprise: particles of 80~120 meshes 55%, particles of 120~200 meshes 30%, and particles of less than 200 meshes as balance;
(p) placing the green body layer, the overglaze layer, the decoration layer, the antiskid and wear-resistant layer and the easy-to-clean protection layer, stacked in sequence, in the drying kiln to undergo secondary drying, with a drying temperature of 150° C.;
(f) placing the green body layer, the overglaze layer, the decoration layer, the antiskid and wear-resistant layer and the easy-to-clean protection layer stacked in sequence, after having undergone the secondary drying, in a kiln to be fired, with a firing temperature of 1180° C., and a firing cycle of 65 min, to prepare an antiskid, wear-resistant and easy-to-dean ceramic tile green body;
(g) subjecting the antiskid, wear-resistant and easy-to-clean ceramic tile green body to a soft mold brushing technology for polishing, wherein polishing molds are arranged in the following order 4 400-mesh soft rubber profiling molds with a pressure of 3 kilograms, 6 600-mesh soft rubber profiling molds with a pressure of 2 kilograms, 6 800-mesh soft rubber profiling molds with a pressure of 1 kilogram, 6 120-mesh abrasive brushes without pressure, 6 200-mesh abrasive brushes without pressure, 4 320-mesh abrasive brushes without pressure, 4 100-mesh sponge molds without pressure, and 8 1000-mesh soft rubber profiling molds without pressure, at a linear velocity of 10 cm/s; and after the polishing is completed, applying a matte liquid wax, followed by edging, to obtain the antiskid, wear-resistant and easy-to-dean ceramic tile.

Example 14

The present example provides a preparation method of an antiskid, wear-resistant and easy-to-clean ceramic tile, and it differs from Example 13 in that Step (s) is omitted in the present example.

Example 15

The present example provides a preparation method of an antiskid, wear-resistant and easy-to-clean ceramic tile, and it differs from Example 13 in that Step (p) is omitted in the present example.

Example 16

An antiskid and wear-resistant glaze is mainly prepared by the following raw materials in parts by mass: 90 parts of antiskid and wear-resistant particles, 90 parts of a printing paste and 0.2 part of sodium tripolyphosphate;
In the above, the antiskid and wear-resistant particles consist of the following components in parts by mass: 60 parts of $SiO_2$, 20 parts of $Al_2O_3$, 0.01 part of $Fe_2O_3$, 0.1 part of $TiO_2$, 1 part of $Na_2O$, 1 part of $K_2O$, 0.01 part of MgO, 0.1 part of CaO and 0.1 part of ignition loss; the printing paste mainly consists of the following components in parts by mass: 5 parts of sodium carboxymethylcellulose, 40 parts of ethylene glycol and 40 parts of water; and the granular compositions of the antiskid and wear-resistant particles comprise: particles of 80-120 meshes 35%, particles of 120-180 meshes 45%, and particles of less than 200 meshes as balance; and the antiskid and wear-resistant glaze has a specific gravity of 1.1 g/cm³ and a flow velocity of 120 seconds.

Example 17

An antiskid and wear-resistant glaze is mainly prepared by the following raw materials in parts by mass: 110 parts of antiskid and wear-resistant particles, 110 parts of a printing paste and 0.4 parts of sodium tripolyphosphate.

In the above, the antiskid and wear-resistant particles consist of the following components in parts by mass: 70 parts of $SiO_2$, 30 parts of $Al_2O_3$, 1 part of $Fe_2O_3$, 2 parts of $TiO_2$, 5 parts of $Na_2O$, 10 parts of $K_2O$, 1 part of MgO, parts of CaO and 2 parts of ignition loss; the printing paste mainly consists of the following components in parts by mass: 8 parts of sodium carboxymethylcellulose, 60 parts of ethylene glycol and 60 parts of water.

The granular compositions of the antiskid and wear-resistant particles comprise: particles of 80-120 meshes 35%, particles of 120-180 meshes 45%, and particles of less than 200 meshes as balance; and the antiskid and wear-resistant glaze has a specific gravity of 1.1 g/cm³ and a flow velocity of 120 seconds.

Contents of various raw materials and contents of components of various raw materials in the present example are all different from those in Example 16.

Example 18

An antiskid and wear-resistant glaze is mainly prepared by the following raw materials in parts by mass: 100 parts of antiskid and wear-resistant particles, 100 parts of a printing paste and 0.3 part of sodium tripolyphosphate;

In the above, the antiskid and wear-resistant particles consist of the following components in parts by mass: 65 parts of $SiO_2$, 25 parts of $Al_2O_3$, 0.5 parts of $Fe_2O_3$, 1 part of $TiO_2$, 2.5 parts of $Na_2O$, 5 parts of $K_2O$, 0.5 part of MgO, 2.5 parts of CaO and 1.5 parts of ignition loss; the printing paste mainly consists of the following components in parts by mass: 10 parts of sodium carboxymethylcellulose, 50 parts of ethylene glycol and 50 parts of water;

The granular compositions of the antiskid and wear-resistant particles comprise: particles of 80-120 meshes 35%, particles of 120-180 meshes 45%, and particles of less than 200 meshes as balance; and the antiskid and wear-resistant glaze has a specific gravity of 1.1 g/cm³ and a flow velocity of 120 seconds.

Contents of various raw materials and contents of components of various raw materials in the present example are all different from those in Example 16.

Example 19

An antiskid and wear-resistant glaze is mainly prepared by the following raw materials in parts by mass: 100 parts of antiskid and wear-resistant particles, 100 parts of a printing paste and 0.3 part of sodium tripolyphosphate; In the above, the antiskid and wear-resistant particles consist of the following components in parts by mass: 68 parts of $SiO_2$, 22 parts of $Al_2O_3$, 0.25 part of $Fe_2O_3$, 0.8 part of $TiO_2$, 2.4 parts of $Na_2O$, 3 parts of $K_2O$, 0.8 part of MgO, 1.8 parts of CaO and 0.9 part of ignition loss. The printing paste mainly consists of the following components in parts by mass: 1 part of sodium carboxymethylcellulose, 55 parts of ethylene glycol and 45 parts of water.

The granular compositions of the antiskid and wear-resistant particles comprise: particles of 80-120 meshes 35%, particles of 120-180 meshes 45%, and particles of less than 200 meshes as balance; and the antiskid and wear-resistant glaze has a specific gravity of 1.1 g/cm³ and a flow velocity of 120 seconds.

Contents of components of various raw materials in the present example are different from those in Example 18.

Example 20

An antiskid and wear-resistant glaze is mainly prepared by the following raw materials in parts by mass: 100 parts of antiskid and wear-resistant particles, 100 parts of a printing paste and 0.3 part of sodium tripolyphosphate.

In the above, the antiskid and wear-resistant particles consist of the following components in parts by mass: 65.87 parts of $SiO_2$, 22.86 parts of $Al_2O_3$, 0.08 part of $Fe_2O_3$, 0.99 part of $TiO_2$, 2.22 parts of $Na_2O$, 4.11 parts of $K_2O$, 0.43 part of MgO, 2.69 parts of CaO and 0.75 part of ignition loss. The printing paste mainly consists of the following components in parts by mass: 2.5 parts of sodium carboxymethylcellulose, 50 parts of ethylene glycol and 50 parts of water.

The granular compositions of the antiskid and wear-resistant particles are: particles of 80~120 meshes 35%, particles of 120-180 meshes 45%, and particles of less than 200 meshes as balance; and the antiskid and wear-resistant glaze has a specific gravity of 1.1 g/cm³ and a flow velocity of 120 seconds.

Example 21

An antiskid and wear-resistant glaze is mainly prepared by the following raw materials in parts by mass: 100 parts of antiskid and wear-resistant particles, 100 parts of a printing paste and 0.3 part of sodium tripolyphosphate;

In the above, the antiskid and wear-resistant particles consist of the following components in parts by mass: 65.87 parts of $SiO_2$, 22.86 parts of $Al_2O_3$, 0.08 part of $Fe_2O_3$, 0.99 part of $TiO_2$, 2.22 parts of $Na_2O$, 4.11 parts of $K_2O$, 0.43 part of MgO, 2.69 parts of CaO and 0.75 part of ignition loss; and the printing paste mainly consists of the following components in parts by mass: 2.5 parts of sodium carboxymethylcellulose, 50 parts of ethylene glycol and 50 parts of water;

The granular compositions of the antiskid and wear-resistant particles comprise: particles of 80~120 meshes 25%, particles of 120~180 meshes 55%, and particles of less than 200 meshes as balance; and the antiskid and wear-resistant glaze has a specific gravity of 1.1 g/cm³ and a flow velocity of 120 seconds.

In the present example, the granular compositions of the antiskid and wear-resistant particles are different from that in Example 20.

Example 22

An antiskid and wear-resistant glaze is mainly prepared by the following raw materials in parts by mass: 100 parts of antiskid and wear-resistant particles, 100 parts of a printing paste and 0.3 part of sodium tripolyphosphate.

In the above, the antiskid and wear-resistant particles consist of the following components in parts by mass: 65.87 parts of $SiO_2$, 22.86 parts of $Al_2O_3$, 0.08 part of $Fe_2O_3$, 0.99 part of $TiO_2$, 2.22 parts of $Na_2O$, 4.11 parts of $K_2O$, 0.43 part of MgO, 2.69 parts of CaO and 0.75 part of ignition loss; and the printing paste mainly consists of the following components in parts by mass: 2.5 parts of sodium carboxymethylcellulose, 50 parts of ethylene glycol and 50 parts of water.

The granular compositions of the antiskid and wear-resistant particles comprise: particles of 80-120 meshes 35%, particles of 120-180 meshes 45%, and particles of less than 200 meshes as balance; and the antiskid and wear-resistant glaze has a specific gravity of 1.2 g/cm³ and a flow velocity of 90 seconds.

In the present example, the specific gravity and the flow velocity of the antiskid and wear-resistant glaze are different from those in Example 20.

Example 23

An antiskid and wear-resistant glaze is mainly prepared by the following raw materials in parts by mass: 100 parts of antiskid and wear-resistant particles, 100 parts of a printing paste and 0.3 part of sodium tripolyphosphate.

In the above, the antiskid and wear-resistant particles consist of the following components in parts by mass: 65.87 parts of $SiO_2$, 22.86 parts of $Al_2O_3$, 0.08 part of $Fe_2O_3$, 0.99 part of $TiO_2$, 2.22 part of $Na_2O$, 4.11 parts of $K_2O$, 0.43 part of MgO, 2.69 parts of CaO and 0.75 part of ignition loss; and the printing paste mainly consists of the following components in parts by mass: 2.5 parts of sodium carboxymethylcellulose, 50 parts of ethylene glycol and 50 parts of water.

The granular compositions of the antiskid and wear-resistant particles comprise: particles of 80-120 meshes 25%, particles of 120-180 meshes 55%, and particles of less than 200 meshes as balance; and the antiskid and wear-resistant glaze has a specific gravity of 1.2 g/cm³ and a flow velocity of 90 seconds.

In the present example, all of the granular compositions of the antiskid and wear-resistant particles, and the specific gravity and the flow velocity of the antiskid and wear-resistant glaze are different from those in Example 20.

Comparative Example 1

The present comparative example provides an antiskid, wear-resistant and easy-to-dean ceramic tile, and the present comparative example differs from Example 7 in that the antiskid and wear-resistant particles consist of the following components in parts by mass: 80 parts of $SiO_2$, 10 parts of $Al_2O_3$, 0.2 part of $Fe_2O_3$, 0.02 part of $TiO_2$, 7 parts of $Na_2$, 0.1 part of $K_2O$, 2 parts of MgO, 0.02 part of CaO and 0.66 part of ignition loss.

Comparative Example 2

The present comparative example provides an antiskid, wear-resistant and easy-to-clean ceramic tile, and the present comparative example differs from Example 7 in that the easy-to-clean protection particles consist of the following components in parts by mass: 50 parts of $SiO_2$, 35 parts of $Al_2O_3$, 0.5 part of $Fe_2O_3$, 0.2 part of $TiO_2$, 2 parts of $Na_2O$, 8 parts of $K_2O$, 0.02 part of MgO, 4 parts of CaO and 0.28 part of ignition loss.

Comparative Example 3

The present example provides an antiskid, wear-resistant and easy-to-clean ceramic tile. The present comparative example differs from Example 7 in that: the antiskid and wear-resistant particles consist of the following components in parts by mass: 50 parts of $SiO_2$, 40 parts of $Al_2O_3$, 10 parts of $Fe_2O_3$, 0.2 part of $TiO_2$, 7 parts of $Na_2O$, 0.1 parts of $K_2O$, 2 parts of MgO, 0.02 part of CaO and 0.66 part of ignition loss; and the easy-to-clean protection particles consist of the following components in parts by mass: 80 parts of $SiO_2$, 5 parts of $Al_2O_3$, 0.5 part of $Fe_2O_3$, 0.2 part of $TiO_2$, 9 parts of $Na_2$, 1 part of $K_2O$, 0.02 part of MgO, 4 parts of CaO and 0.28 part of ignition loss.

Comparative Example 4

The present example provides an antiskid, wear-resistant and easy-to-clean ceramic tile. The present comparative example differs from Example 7 in that no antiskid and wear-resistant layer is provided.

Comparative Example 5

The present example provides an antiskid, wear-resistant and easy-to-clean ceramic tile. The present comparative example differs from Example 7 in that no easy-to-clean protection layer is provided.

The preparation methods of antiskid, wear-resistant and easy-to-clean ceramic tiles provided in Comparative Examples 1-3 are the same as Example 7, and will not be repeatedly described herein. The preparation method of the antiskid, wear-resistant and easy-to-clean ceramic tile provided in Comparative Example 4 does not involve the preparation of the antiskid and wear-resistant layer, while all the other steps are the same as Example 7, and will not be repeatedly described herein. The preparation method of the antiskid, wear-resistant and easy-to-clean ceramic tile provided in Comparative Example 5 does not involve the preparation of the antiskid and wear-resistant layer, while all the other steps are the same as Example 7, and will not be repeatedly described herein.

Tests for the wear-resistant performances, the antiskid performances and the easy-to-clean performances are performed on the antiskid, wear-resistant and easy-to-clean ceramic tiles provided in the above Examples 1-12 and the antiskid, wear-resistant and easy-to-clean ceramic tiles provided in Comparative Examples 1-5, and results are shown in the following table:

TABLE 1

Table of Test Results of Performances of the Antiskid, Wear-resistant and Easy-to-clean Ceramic Tiles

|  | Anti-skid coefficient (wet state) | Wear-resistant grade (grade) | Oil stain residual volume per unit area (g/m²) |
| --- | --- | --- | --- |
| Example 1 | 0.58 | 5 | 0.48 |
| Example 2 | 0.59 | 5 | 0.46 |
| Example 3 | 0.64 | 5 | 0.44 |
| Example 4 | 0.65 | 5 | 0.43 |
| Example 5 | 0.71 | 5 | 0.42 |
| Example 6 | 0.72 | 5 | 0.41 |
| Example 7 | 0.77 | 5 | 0.40 |
| Example 8 | 0.46 | 4 | 0.50 |
| Example 9 | 0.43 | 4 | 0.49 |
| Example 10 | 0.61 | 5 | 0.75 |
| Example 11 | 0.62 | 5 | 0.56 |
| Example 12 | 0.41 | 4 | 0.83 |
| Comparative Example 1 | 0.31 | 3 | 0.50 |
| Comparative Example 2 | 0.61 | 5 | 1.2 |

TABLE 1-continued

Table of Test Results of Performances of the Antiskid,
Wear-resistant and Easy-to-clean Ceramic Tiles

|  | Anti-skid coefficient (wet state) | Wear-resistant grade (grade) | Oil stain residual volume per unit area (g/m$^2$) |
|---|---|---|---|
| Comparative Example 3 | 0.38 | 3 | 1.3 |
| Comparative Example 4 | 0.31 | 2 | 0.56 |
| Comparative Example 5 | 0.62 | 5 | 2.1 |

The above wear-resistant performance is tested according to GB/T3810.7. If no wear marks are visible on a sample at 12000 turns, but contaminants cannot be wiped off using methods listed in GB/T3810.14, the wear-resistant grade is grade 4.

The above easy-to-dean performance is tested according to GB1T23764. The easy-to-clean performance represents difficulty of cleaning the ceramic tile indicated using the oil stain residual volume A per unit area, wherein A≤0.50 indicates being easy to dean, 0.50<A≤1.00 indicates being relatively easy to clean, 1.00<A≤1.5 indicates being cleanable, A>1.5 indicates being not easy to dean.

It can be seen from Table 1 that all of the antiskid, wear-resistant and easy-to-dean ceramic tiles provided in Examples 1-7 have the wear-resistant coefficients of lower than 0.5, the wear-resistant grade of grade 5, and the oil stain residual volume per unit area of not more than 0.5 g/m$^2$, which indicates that the antiskid, wear-resistant and easy-to-clean ceramic tiles provided in Examples 1-7 not only have high wear-resistant strength and are not easily worn, but also render high antiskid coefficients to products which can effectively prevent people from falling down and improve the safety of the products, and meanwhile, they also have excellent pollution resistance, are not prone to hide dirt, are easily cleaned, facilitate daily tending, and satisfy people's requirements to the antiskid, wear-resistant and easy-to-dean functions of the ceramic archaized tiles.

By comparing Examples 1-7 and Comparative Examples 1 and 3, it can be seen that both of the antiskid, wear-resistant and easy-to-dean ceramic tiles provided in Comparative Example 1 and Comparative Example 3 have the wear-resistant coefficients of lower than 0.5, and the wear-resistant grade of grade 3, which indicates that the antiskid and wear-resistant layer prepared by the antiskid and wear-resistant particles made through the synergistic cooperation of $SiO_2$, $Al_2O_3$, $Fe_2O_3$, $TiO_2$, $Na_2O$, $K_2O$, MgO and CaO of specific parts by mass can remarkably improve the antiskid performance and the wear-resistant performance of the antiskid, wear-resistant and easy-to-dean ceramic tiles, such that they satisfy people's requirements to the wear-resistant and antiskid functions of the ceramic tiles.

By comparing Examples 1-7 and Comparative Examples 2 and 3, it can be seen that the easy-to-dean performances of the antiskid, wear-resistant and easy-to-dean ceramic tiles provided in Comparative Example 2 and Comparative Example 3 merely can achieve the standard of being cleanable, but cannot achieve the standard of being easy to clean, which indicates that the easy-to-clean protection layer prepared by the easy-to-clean protection particles made through the synergistic cooperation of $SiO_2$, $Al_2O_3$, $Fe_2O_3$, $TiO_2$, $Na_2O$, $K_2O$, MgO and CaO of specific parts by mass can remarkably improve the easy-to-dean performance of the antiskid, wear-resistant and easy-to-dean ceramic tiles, such that they are easier to tend and satisfy people's requirements to aesthetics and easy-to-clean functions of the ceramic tiles.

By comparing Examples 1-7 and Comparative Example 4, it can be seen that the antiskid, wear-resistant and easy-to-clean ceramic tile provided in Comparative Example 4 merely has the antiskid coefficient of 0.31 and the wear-resistant grade of grade 2, which indicates that providing the antiskid and wear-resistant layer on the antiskid, wear-resistant and easy-to-dean ceramic tile can remarkably improve its antiskid performance and easy-to-clean performance, prevent people from falling down, and improve safety performance of the product.

By comparing Examples 1-7 and Comparative Example 5, it can be seen that the antiskid, wear-resistant and easy-to-clean ceramic tile provided in Comparative Example 5 belongs to the category of being not easy to clean, which indicates that providing the easy-to-clean protection layer on the antiskid, wear-resistant and easy-to-clean ceramic tile remarkably improves its contamination-resistant performance and easy-to-dean performance, such that the ceramic tile is easier to tend and more beautiful.

By comparing Examples 1-7, Examples 8 and 9 and Example 12, it can be seen that through the synergistic interaction of the printing paste, sodium tripolyphosphate and the antiskid and wear-resistant particles of specific parts by mass, the antiskid and wear-resistant glaze used in the present disclosure can be more uniformly and more stably applied on the surface of the overglaze layer, such that the antiskid, wear-resistant and easy-to-dean ceramic tiles have more excellent wear-resistant and antiskid performances.

By comparing Examples 1-7, Examples 10 and 11 and Example 12, it can be seen that through the synergistic interaction of the printing ink, the transparent glaze and the easy-to-clean protection particles of specific parts by mass, the easy-to-clean protection glaze used in the present disclosure can more uniformly cover the surface of the antiskid and wear-resistant layer, such that the antiskid, wear-resistant and easy-to-clean ceramic tiles provided in the present disclosure have more excellent performance of being easier to clean.

Finally, it is to be understood that the above-mentioned examples are merely used to illustrate the technical solutions of the present invention, rather than limiting the invention; while the detailed description is made to the present invention with reference to the above-mentioned examples, those of ordinary skill in the art should understand that the technical solutions recited in the above-mentioned examples can be modified, or equivalent substitutions can be made to some or all of the technical features; and these modifications or substitutions do not make the corresponding technical solutions necessarily depart from the spirit and scope of the technical solutions of the examples of the present invention.

INDUSTRIAL APPLICABILITY

The antiskid and wear-resistant glaze provided in the present disclosure mainly consists of three raw materials, namely, the antiskid and wear-resistant particles, the printing paste and sodium tripolyphosphate. Through reasonable cooperation of various raw materials and various components of the antiskid and wear-resistant particles, the antiskid and wear-resistant glaze has good antiskid and wear-resistant effects, and meanwhile, also has relatively high transparency and relatively low glossiness, and renders when being applied to the surface of ceramic products advantages of excellent antiskid and wear-resistant effects and improvements on continuity and clearness of pattern textures of the products.

For the antiskid and wear-resistant ceramic tile provided in the present disclosure, by sequentially stacking the antiskid and wear-resistant layer and the easy-to-dean protection layer on the decoration layer, the antiskid and wear-resistant ceramic tile not only has high wear-resistant strength and is not easily worn, but also renders high antiskid coefficients to products, which can effectively prevent people from falling down and improve the safety of the products, and meanwhile, it also has excellent pollution resistance, is not prone to hide dirt, is easily cleaned, facilitates daily tending, and satisfies people's requirements to the antiskid, wear-resistant and easy-to-clean functions of the ceramic archaized tiles.

Besides, for the preparation method of an antiskid, wear-resistant and easy-to-dean ceramic tile provided in the present disclosure, by preparing and stacking in turn the green body layer, the overglaze layer, the decoration layer, the antiskid and wear-resistant layer and the easy-to-clean protection layer, the prepared antiskid, wear-resistant and easy-to-dean ceramic tile not only has high wear-resistant strength and is not easily worn, but also renders high antiskid coefficients to the products, which can effectively prevent people from falling down and improve the safety of the product, and meanwhile, it further has excellent pollution resistance, is not prone to hide dirt, is easily cleaned, facilitates daily tending, and satisfies people's requirements to the antiskid, wear-resistant and easy-to-clean functions of the ceramic archaized tiles.

The invention claimed is:

1. An antiskid, wear-resistant and easy-to-clean ceramic tile, comprising, from the bottom up, a green body layer, an overglaze layer, a decoration layer, an antiskid and wear-resistant layer and an easy-to-clean protection layer provided in sequence, wherein the antiskid and wear-resistant layer is prepared by an antiskid and wear-resistant glaze, the antiskid and wear-resistant glaze is prepared by antiskid and wear-resistant particles, and the antiskid and wear-resistant particles comprises following components in parts by mass: 60~70 parts of $SiO_2$, 20~30 parts of $Al_2O_3$, 0.01~0.1 part of $Fe_2O_3$, 0.1~2 parts of $TiO_2$, 1~5 parts of $Na_2O$, 1~10 parts of $K_2O$, 0.1~1 part of MgO, 0.1~5 parts of CaO and 0.1~2 parts of ignition loss, with sum of all the components being 100 parts; and the easy-to-clean protection layer is prepared by an easy-to-clean protection glaze, the easy-to-clean protection glaze is prepared by easy-to-clean protection particles, and the easy-to-clean protection particles comprise following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2O$, 2~6 parts of $K_2O$, 0.05~0.3 part of MgO, 0.5~3 parts of CaO and 0.05~0.3 part of ignition loss, with sum of all the components being 100 parts.

2. The antiskid, wear-resistant and easy-to-clean ceramic tile according to claim 1, wherein the antiskid and wear-resistant particles comprise following components in parts by mass: 62~68 parts of $SiO_2$, 20~25 parts of $Al_2O_3$, 0.05~0.1 part of $Fe_2O_3$, 0.5~1.5 parts of $TiO_2$, 2~3 parts of $Na_2O$, 2~6 parts of $K_2O$, 0.2~0.8 part of MgO, 2~4 parts of CaO and 0.1~1.5 parts of ignition loss, with sum of all the components being 100 parts; and the easy-to-clean protection particles comprise following components in parts by mass: 62~68 parts of $SiO_2$, 18~23 parts of $Al_2O_3$, 0.1~0.2 part of $Fe_2O_3$, 0.02~0.08 part of $TiO_2$, 5~7 parts of $Na_2O$, 3~6 parts of $K_2O$, 0.1~0.2 part of MgO, 1~3 parts of CaO and 0.1~0.3 part of ignition loss, with sum of all the components being 100 parts.

3. The antiskid, wear-resistant and easy-to-clean ceramic tile according to claim 1, wherein the antiskid and wear-resistant particles comprise following components in parts by mass: 65~66 parts of $SiO_2$, 22~23 parts of $Al_2O_3$, 0.07~0.09 part of $Fe_2O_3$, 0.9~1.1 parts of $TiO_2$, 2~2.5 parts of $Na_2O$, 4~5 parts of $K_2O$, 0.3~0.5 part of MgO, 2~3 parts of CaO and 0.7~0.8 part of ignition loss, with sum of all the components being 100 parts; and the easy-to-clean protection particles comprise following components in parts by mass: 66~67 parts of $SiO_2$, 20~22 parts of $Al_2O_3$, 0.15~0.2 part of $Fe_2O_3$, 0.05~0.07 part of $TiO_2$, 5~7 parts of $Na_2O$, 4~5 parts of $K_2O$, 0.1~0.15 part of MgO, 1.5~2 parts of CaO and 0.1~0.2 part of ignition loss, with sum of all the components being 100 parts.

4. The antiskid, wear-resistant and easy-to-clean ceramic tile according to claim 1, wherein the easy-to-clean protection glaze further comprise, in parts by mass, 230~270 parts of a printing ink and 20~40 parts of a transparent glaze; and the printing ink comprises following components in parts by mass: 1~2 parts of sodium carboxymethylcellulose, 20~40 parts of ethylene glycol, 1~5 parts of bentonite and 60~80 parts of water.

5. The antiskid, wear-resistant and easy-to-clean ceramic tile according to claim 4, wherein the transparent glaze comprise following components in parts by mass: 12~16 parts of soda feldspar, 20~24 parts of potassium feldspar, 13~17 parts of calcined talc, 7~11 parts of limestone, 8~12 parts of barium carbonate and 1~5 parts of zinc oxide.

6. The antiskid, wear-resistant and easy-to-clean ceramic tile according to claim 1, wherein granular compositions of the antiskid and wear-resistant particles comprise: particles of 80-120 meshes 20%~30%, particles of 120-180 meshes 50%~60%, and particles of less than 200 meshes as balance; and preferably, the antiskid and wear-resistant particles have a specific gravity of 1.2~1.8 $g/cm^3$.

7. The antiskid, wear-resistant and easy-to-clean ceramic tile according to claim 1, wherein granular compositions of the antiskid and wear-resistant particles comprise: particles of 80~120 meshes 50%~60%, particles of 120~200 meshes 20%~30%, and particles of less than 200 meshes as balance; and preferably, the easy-to-clean protection particles have a specific gravity of 1.2~1.4 $g/cm^3$.

8. The antiskid, wear-resistant and easy-to-clean ceramic tile according to claim 1, wherein the overglaze layer is prepared by an overglaze, and the overglaze is prepared by following raw materials in parts by mass: 20~30 parts of potassium feldspar, 15~30 parts of quartz, 15~25 parts of nepheline, 5~10 parts of calcined kaolin, 5~15 parts of aluminum oxide, 1~8 parts of wollastonite, 0.1~2 parts of zinc oxide, 10~30 parts of zirconium silicate, 10~20 parts of columnar kaolin, 0.1~0.3 part of sodium humate, 0.1~0.3 part of sodium carboxymethylcellulose and 0.1~0.3 part of sodium tripolyphosphate.

9. The antiskid, wear-resistant and easy-to-clean ceramic tile according to claim 1, wherein the green body layer is prepared by a blank, the blank is prepared by following raw materials in parts by mass: 18~22 parts of quartz sand, 12~18 parts of potassium and sodium sand, 16~20 parts of water washed mud, 9~13 parts of white mud, 28~33 parts of potassium sand, 0.5~1.5 parts of bentonite and 2~3 parts of black talc.

10. A preparation method of an antiskid, wear-resistant and easy-to-clean ceramic tile, comprising following steps of:

(a) preparing a green body layer using a blank;
(b) applying an overglaze on the green body layer to form an overglaze layer;
(c) performing ink-jet printing on the overglaze layer to prepare a decoration layer;
(d) printing an antiskid and wear-resistant glaze on the decoration layer to form an antiskid and wear-resistant layer, wherein the antiskid and wear-resistant glaze is prepared by antiskid and wear-resistant particles, and the antiskid and wear-resistant particles comprise following components in parts by mass: 60~70 parts of $SiO_2$, 20~30 parts of $Al_2O_3$, 0.01~0.1 part of $Fe_2O_3$, 0.1~2 parts of $TiO_2$, 1~5 parts of $Na_2O$, 1~10 parts of $K_2O$, 0.1~1 part of MgO, 0.1~5 parts of CaO and 0.1~2 parts of ignition loss;
(e) applying an easy-to-clean protection glaze on the antiskid and wear-resistant layer to form an easy-to-clean protection layer, wherein the easy-to-clean protection glaze is prepared by easy-to-clean protection particles, and the easy-to-clean protection particles comprise following components in parts by mass: 60~70 parts of $SiO_2$, 15~25 parts of $Al_2O_3$, 0.1~0.3 part of $Fe_2O_3$, 0.01~0.1 part of $TiO_2$, 4~8 parts of $Na_2O$, 2~6 parts of $K_2O$, 0.05~0.3 part of MgO, 0.5~3 parts of CaO and 0.05~0.3 part of ignition loss;
(f) placing the green body layer, the overglaze layer, the decoration layer, the antiskid and wear-resistant layer and the easy-to-clean protection layer stacked in sequence in a kiln to be fired, to prepare an antiskid, wear-resistant and easy-to-clean ceramic tile green body; and
(g) carrying out polishing and edging treatments on the antiskid, wear-resistant and easy-to-clean ceramic tile green body to obtain the antiskid, wear-resistant and easy-to-clean ceramic tile.

11. The preparation method of an antiskid, wear-resistant and easy-to-clean ceramic tile according to claim 10, further comprising Step (s) primary drying, wherein Step (s) is provided between Step (a) and Step (b), and Step (s) comprises placing the green body layer in a drying kiln to be dried, with a drying temperature of 100~160° C., and a drying cycle of 50~70 min.

12. The preparation method of an antiskid, wear-resistant and easy-to-clean ceramic tile according to claim 10, further comprising Step (p) secondary drying, wherein Step (p) is provided between Step (e) and Step (f), and Step (p) comprises placing the green body layer, the overglaze layer, the decoration layer, the antiskid and wear-resistant layer and the easy-to-clean protection layer stacked in sequence in a drying kiln to be dried, with a drying temperature of 140~160° C., preferably 150° C.

13. The preparation method of an antiskid, wear-resistant and easy-to-clean ceramic tile according to claim 10, wherein in Step (f), a firing temperature is 1175~1185° C., and a firing cycle is 60~70 min.

14. The preparation method of an antiskid, wear-resistant and easy-to-clean ceramic tile according to claim 10, wherein in Step (g), the polishing is carried out through a soft-mold brush-polishing technology.

15. The preparation method of an antiskid, wear-resistant and easy-to-clean ceramic tile according to claim 10, wherein in Step (a), the green body layer is press-molded through a concave-convex mold.

16. The preparation method of an antiskid, wear-resistant and easy-to-clean ceramic tile according to claim 10, wherein in Step (d), the antiskid and wear-resistant glaze is silk-screen printed, with a silk screen having 75~85 meshes, preferably 80 meshes.

17. The preparation method of an antiskid, wear-resistant and easy-to-clean ceramic tile according to claim 10, wherein in Step (e), the easy-to-clean protection glaze is applied in a linear glaze pouring manner, with an application amount of 300~350 g/m$^2$, preferably 321 g/m$^2$.

\* \* \* \* \*